US012637110B2

(12) United States Patent　　(10) Patent No.:　US 12,637,110 B2
Lind et al.　　(45) Date of Patent:　May 26, 2026

(54) ADAPTING AN AUTONOMOUS VEHICLE'S NAVIGATION BASED ON FEEDBACK FROM A COOLING SYSTEM

(71) Applicant: TuSimple, Inc., San Diego, CA (US)

(72) Inventors: Thomas Holladay Lind, Vail, AZ (US); Patrick James McNamara, Tucson, AZ (US)

(73) Assignee: CreateAI, Inc., San Diego, CA (US)

( * ) Notice: Subject to any disclaimer, the term of this patent is extended or adjusted under 35 U.S.C. 154(b) by 63 days.

(21) Appl. No.: 18/906,583

(22) Filed: Oct. 4, 2024

(65) Prior Publication Data

US 2025/0128737 A1　　Apr. 24, 2025

Related U.S. Application Data

(60) Provisional application No. 63/591,475, filed on Oct. 19, 2023.

(51) Int. Cl.
　　*B60W 60/00*　　(2020.01)
　　*B60H 1/00*　　(2006.01)
　　*G07C 5/00*　　(2006.01)
(52) U.S. Cl.
　　CPC ... *B60W 60/00186* (2020.02); *B60H 1/00885* (2013.01); *G07C 5/008* (2013.01)
(58) Field of Classification Search
　　CPC ......... B60W 60/00186; B60H 1/00885; G07C 5/008
　　USPC ........................................................ 340/606
　　See application file for complete search history.

(56) References Cited

U.S. PATENT DOCUMENTS

| | | | | |
|---|---|---|---|---|
| 10,054,947 B2 * | 8/2018 | Mays | | B60T 7/18 |
| 2017/0210196 A1 * | 7/2017 | Bidner | | B60H 1/00492 |
| 2018/0050704 A1 * | 2/2018 | Tascione | | G07C 5/0808 |
| 2019/0168570 A1 * | 6/2019 | Lee | | B60H 1/32284 |
| 2020/0298663 A1 * | 9/2020 | Allgaeuer | | B60H 1/00885 |
| 2020/0398636 A1 * | 12/2020 | He | | B60H 1/00507 |
| 2021/0094489 A1 * | 4/2021 | Damaraju | | B60R 16/0232 |
| 2021/0243913 A1 * | 8/2021 | Zheng | | H05K 7/202 |

(Continued)

FOREIGN PATENT DOCUMENTS

| | | |
|---|---|---|
| DE | 102021003218 A1 | 9/2021 |
| EP | 4245585 A1 | 9/2023 |

OTHER PUBLICATIONS

International Search Report from PCTCN2021101151, dated Jan. 31, 2025 (13 pages).

(Continued)

*Primary Examiner* — Kerri L Mcnally

(74) *Attorney, Agent, or Firm* — Perkins Coie LLP

(57) ABSTRACT

A system receives, from one or more flow rate sensor circuits, one or more signals that indicate the flow rate of coolant provided to a set of circuit boards. The one or more flow rate sensor circuits are configured to detect the flow rate of the coolant traveling from one or more pumps towards the set of circuit boards. The one or more pumps are configured to direct a flow of the coolant towards the set of circuit boards. The system compares the flow rate of the coolant to a threshold flow rate. The system determines that a total flow rate of the coolant is less than the threshold flow rate. The system causes the autonomous vehicle to perform a minimal risk maneuver in response to determining that the flow rate of the coolant is less than the threshold flow rate.

20 Claims, 8 Drawing Sheets

(56) References Cited

U.S. PATENT DOCUMENTS

| | | | | |
|---|---|---|---|---|
| 2021/0331552 A1* | 10/2021 | Cho | ................... | B60H 1/00807 |
| 2021/0402842 A1* | 12/2021 | Damaraju | .......... | B60H 1/00278 |
| 2022/0266720 A1* | 8/2022 | Hariharan | ......... | H01M 10/6569 |
| 2023/0094431 A1* | 3/2023 | Zhao | ......................... | B60L 1/02 |
| | | | | 701/22 |
| 2023/0347708 A1* | 11/2023 | Steurer | ................. | B60H 1/323 |
| 2024/0109398 A1* | 4/2024 | Kim | ................... | B60H 1/00921 |

OTHER PUBLICATIONS

International Search Report from PCT/US2024/049909, dated Jan. 21, 2025 (15 pages).

* cited by examiner

500

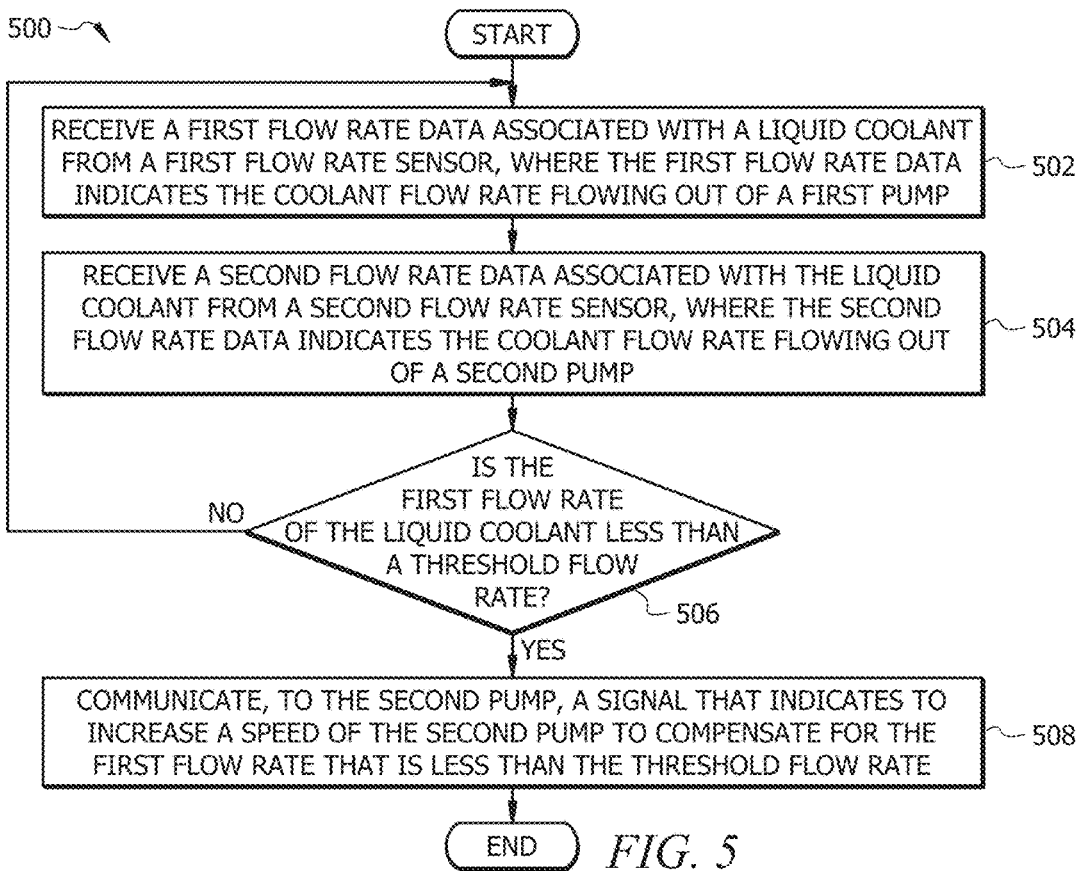

START

RECEIVE A FIRST FLOW RATE DATA ASSOCIATED WITH A LIQUID COOLANT FROM A FIRST FLOW RATE SENSOR, WHERE THE FIRST FLOW RATE DATA INDICATES THE COOLANT FLOW RATE FLOWING OUT OF A FIRST PUMP ~ 502

RECEIVE A SECOND FLOW RATE DATA ASSOCIATED WITH THE LIQUID COOLANT FROM A SECOND FLOW RATE SENSOR, WHERE THE SECOND FLOW RATE DATA INDICATES THE COOLANT FLOW RATE FLOWING OUT OF A SECOND PUMP ~ 504

IS THE FIRST FLOW RATE OF THE LIQUID COOLANT LESS THAN A THRESHOLD FLOW RATE? ~ 506

NO

YES

COMMUNICATE, TO THE SECOND PUMP, A SIGNAL THAT INDICATES TO INCREASE A SPEED OF THE SECOND PUMP TO COMPENSATE FOR THE FIRST FLOW RATE THAT IS LESS THAN THE THRESHOLD FLOW RATE ~ 508

END *FIG. 5*

600

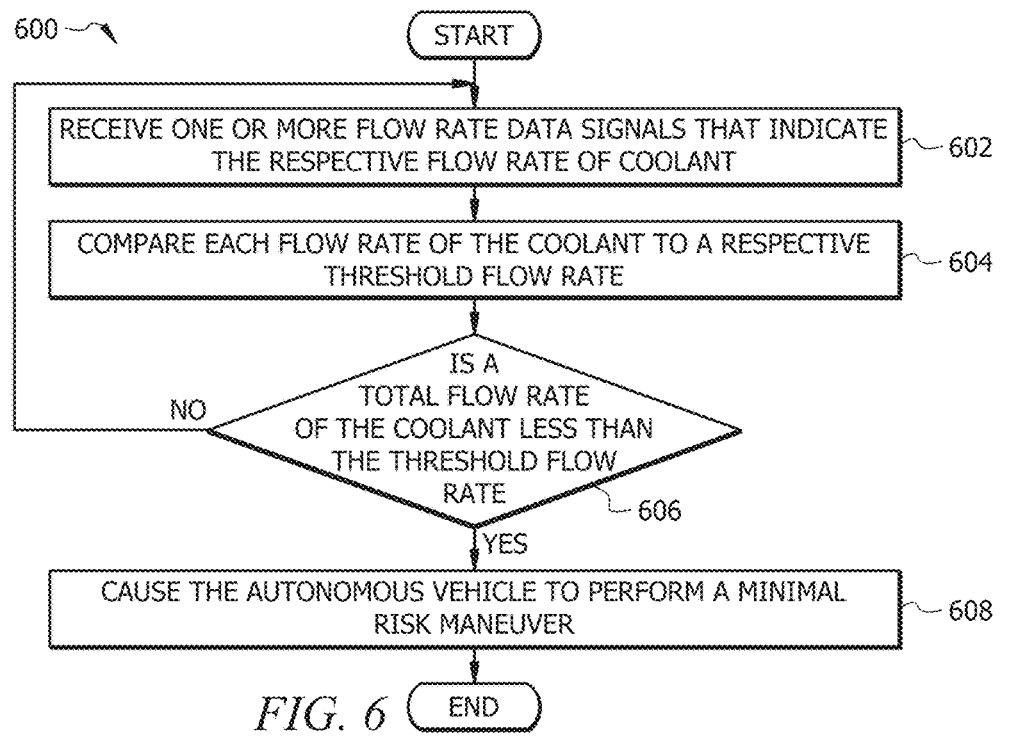

START

RECEIVE ONE OR MORE FLOW RATE DATA SIGNALS THAT INDICATE THE RESPECTIVE FLOW RATE OF COOLANT ~ 602

COMPARE EACH FLOW RATE OF THE COOLANT TO A RESPECTIVE THRESHOLD FLOW RATE ~ 604

IS A TOTAL FLOW RATE OF THE COOLANT LESS THAN THE THRESHOLD FLOW RATE ~ 606

NO

YES

CAUSE THE AUTONOMOUS VEHICLE TO PERFORM A MINIMAL RISK MANEUVER ~ 608

*FIG. 6* END

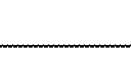
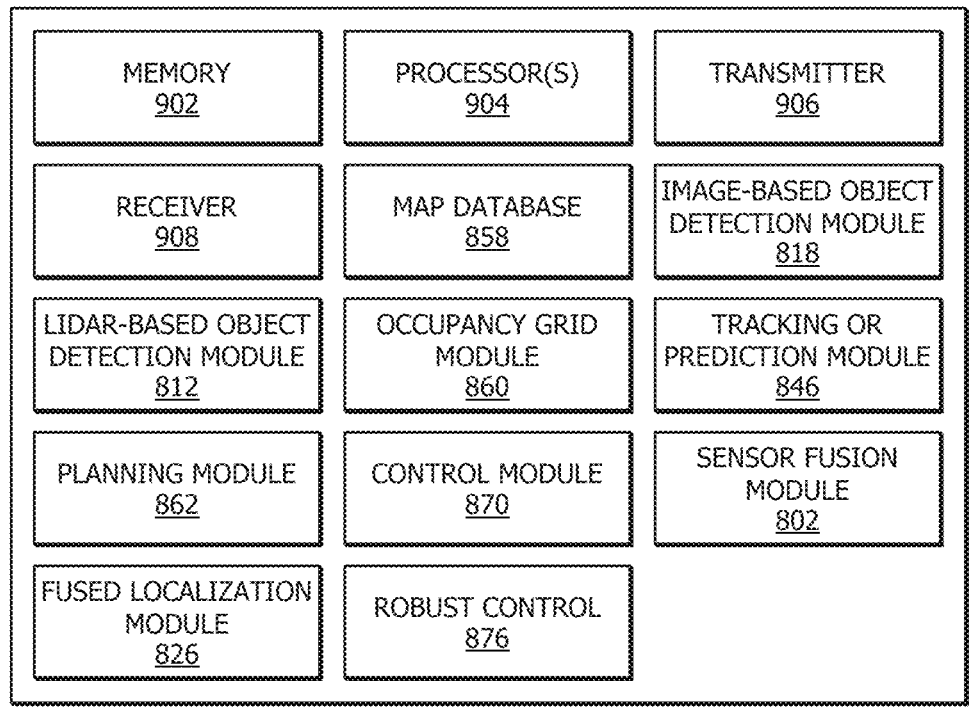
*FIG. 9*

ADAPTING AN AUTONOMOUS VEHICLE'S NAVIGATION BASED ON FEEDBACK FROM A COOLING SYSTEM

CROSS-REFERENCE TO RELATED APPLICATIONS

This application claims priority to and the benefit of U.S. Provisional Application No. 63/591,475, filed on Oct. 19, 2023. The aforementioned application of which is incorporated herein by reference in its entirety.

TECHNICAL FIELD

The present document relates generally to autonomous vehicles. More particularly, the present document is related to adapting an autonomous vehicle's navigation based on feedback from a cooling system.

BACKGROUND

One aim of autonomous vehicle technologies is to provide vehicles that can safely navigate towards a destination. When some internal components of an autonomous vehicle get overheated, some or all operations of the autonomous vehicle may be degraded. For example, the autonomous vehicle may not be able to navigate autonomously with a preconfigured accuracy. This may lead to unsafe driving conditions for the autonomous vehicle and other vehicles traveling on the same road as the autonomous vehicle.

SUMMARY

This document recognizes various problems and previously unmet needs related to implementing safe navigation for an autonomous vehicle in situations where a cooling system of the autonomous vehicle is not operating as expected to provide proper cooling to the in-vehicle computing systems. Certain embodiments of the present document provide unique technical solutions to technical problems of current autonomous vehicle technologies, including those problems described above, to adapt or adjust one or more operations of the autonomous vehicle based on feedback from the cooling system of the autonomous vehicle.

The disclosed system is configured to implement a cooling system that is configured to provide appropriate cooling to the in-vehicle computing systems according to various cooling requirements of the in-vehicle computing systems while meeting the spacing requirement.

One approach to provide cooling to computing devices that facilitate autonomous operations of the autonomous vehicle is to implement a cooling system with automatic or manual valves along the flow path of the coolant to control the flow rate of the coolant flowing through the coolant lines. In such approaches, standard-sized components, such as coolant lines, manifolds, and connectors, are used for all of the circuit boards, and a controller is installed to receive coolant flow rate data and control the valves based on the received coolant flow rate data to adjust the amount of coolant being provided to the circuit board. However, this approach suffers from several drawbacks. For example, utilizing the standard-sized components may increase the overall size of the cooling system. For example, if a circuit board requires a slow flow rate of coolant, the valves along the flow path of the coolant are closed to a certain degree to restrict the flow rate of the coolant. However, in this example, the standard-sized cooling components occupy more space than actually needed. Therefore, in current approaches, the cooling system may not be deployed within a space with predefined and stringent spacing constraints to satisfy the spacing requirements. In other words, the overuse of standard-sized cooling components increases the overall size of the cooling system. Consequently, it becomes challenging to deploy the cooling system in spaces with predefined and stringent spacing constraints, which are often essential to meet specific design requirements.

Furthermore, although using the controller to control the valves provides flexibility to control of the flow rate of the coolant, however current approaches lead to more complex computations to analyze the coolant flow rates in real-time or with acceptable latency which increases potential failure opportunities in providing proper cooling to circuit boards. For example, the complex computations in analyzing and controlling the coolant flow rates via valves lead to providing more cooling than necessary on some occasions and less cooling than required on other occasions. This, in turn, causes the circuit boards to overheat, which reduces the performance and lifespan of the circuit boards. Therefore, using a controller to adjust the coolant flow rate via closing and opening values provides inefficient cooling.

The disclosed system provides a technical solution to this and other technical problems currently arising in the realm of cooling techniques for autonomous vehicles. For example, the disclosed system provides the cooling system whose components are sized according to the required flow rates of the coolant for various in-vehicle computer systems instead of using valves to control the flow rates of the coolant. Therefore, the flow rate of the coolant is controlled by the size of the component through which the coolant is flowing instead of manual or automatic control of valves to adjust the flow rate of the coolant. This technique reduces the form factor of the components of the cooling system which leads to allowing the cooling system to meet the spacing requirement.

It is also challenging to provide cooling to the electrical components on the in-vehicle computing system due to the electrical components being closely spaced. To provide a solution to this and other problems, the disclosed cooling system is configured to operate with liquid coolant. Liquid coolant provides more efficient cooling compared to air or air-liquid cooling. Therefore, the disclosed system provides a practical application of providing a more efficient cooling to the in-vehicle computing system of the autonomous vehicle by implementing a liquid-coolant-based cooling system.

Furthermore, the disclosed system is configured to adjust one or more operations of the autonomous vehicle based on feedback from the cooling system. For example, in an example scenario, pumps of the cooling system are configured to provide the coolant with a particular flow rate. If a first pump has a malfunction (such as hardware malfunction or blockage), the pump may not be able to propel the coolant with the predefined flow rate. In such cases, the disclosed system may instruct other pump(s) to increase their speed to provide the coolant at a higher flow rate to compensate for the slow flow rate at the first pump.

In some cases where both pumps of the cooling system have malfunctions and cannot propel the coolant at the particular flow rate, the total flow rate of the coolant may be less than desired to provide proper cooling to the in-vehicle computer systems and satisfy their cooling requirements. In such cases, the cooling system may provide feedback to a control device of the autonomous vehicle, where the feedback may include the total flow rate of the coolant. The control device may determine that the total flow rate of the coolant is less than the predefined flow rate. In response, the control device may instruct the autonomous vehicle to perform a minimal risk maneuver. For example, the minimal risk maneuver may include reducing the speed of the autonomous vehicle to reduce the computing complexity in navigating the autonomous vehicle and detecting objects on the road at the current speed.

Accordingly, the disclosed system may improve the safety in navigation of the autonomous vehicles and provide a safer driving experience for the autonomous vehicle, other vehicles traveling on the same road as the autonomous vehicle, and pedestrians.

Liquid Coolant-Based Cooling Configuration for Autonomous Vehicles

In some embodiments, a cooling system for an autonomous vehicle comprises a set of pumps, a set of flow rate sensor circuits, and a cooling subsystem operably coupled with a processor. The set of pumps includes a first pump and a second pump. The set of flow rate sensors includes a first flow rate sensor circuit configured to detect a liquid coolant flow rate on an outlet of the first pump and a second flow rate sensor circuit configured to detect the liquid coolant flow rate on an outlet of the second pump. The cooling subsystem is configured to provide the liquid coolant to an intake manifold through which the liquid coolant flows toward one or more circuit boards. The processor is configured to receive a first flow rate data from the first flow rate sensor circuit, wherein the first flow rate data indicates the first flow rate of the liquid coolant flowing out from the first pump. The processor is further configured to receive a second flow rate data from the second flow rate sensor circuit, wherein the second flow rate data indicates a second flow rate of the liquid coolant flowing out of the second pump. The processor is further configured to detect that the first flow rate of the liquid coolant is less than a threshold flow rate. In response to determining that the first flow rate of the liquid coolant is less than the threshold flow rate, the processor is further configured to communicate, to the second pump, a signal that indicates to increase a speed of the second pump to increase the second flow rate of the liquid coolant flowing out of the second pump and compensate for the first flow rate that is less than the threshold flow rate.

Adapting Autonomous Vehicle's Navigation Based on Feedback from a Cooling System In some embodiments, a system for adjusting the navigation of an autonomous vehicle based on feedback from a cooling system comprises an autonomous vehicle, a cooling system associated with the autonomous vehicle, and a processor associated with the autonomous vehicle. The autonomous vehicle is configured to travel on a road autonomously. The cooling system comprises one or more pumps and one or more flow rate sensor circuits. Each of the one or more pumps is configured to direct a flow of a coolant towards a set of circuit boards. Each of the one or more flow rate sensor circuits is configured to detect a flow rate of the coolant traveling from the one or more pumps toward the set of circuit boards. The processor is configured to receive, from the one or more flow rate sensor circuits, one or more signals that indicate the flow rate of the coolant provided to the set of circuit boards. The processor is further configured to compare the flow rate of the coolant to a threshold flow rate. The processor is further configured to determine that the total flow rate of the coolant is less than the threshold flow rate. The processor is further configured to cause the autonomous vehicle to perform a minimal risk maneuver in response to determining that the flow rate of the coolant is less than the threshold flow rate.

Certain embodiments may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this document, reference is now made to the following brief description, taken in connection with the accompanying drawings and detailed description, wherein like reference numerals represent like parts.

FIG. 5 illustrates an example flowchart of a method for controlling pumps of the cooling system;

FIG. 6 illustrates an example flowchart of a method for adjusting the navigation of the autonomous vehicle in response to feedback from the cooling system;

FIG. 9 illustrates a block diagram of an in-vehicle control computer included in the autonomous vehicle of FIG. 7.

DETAILED DESCRIPTION

As described above, previous technologies fail to provide efficient, reliable, and safe solutions for implementing a cooling system for an autonomous vehicle. The present document provides various systems, methods, and devices to implement a cooling system for an autonomous vehicle.

Example System

Figure 1:
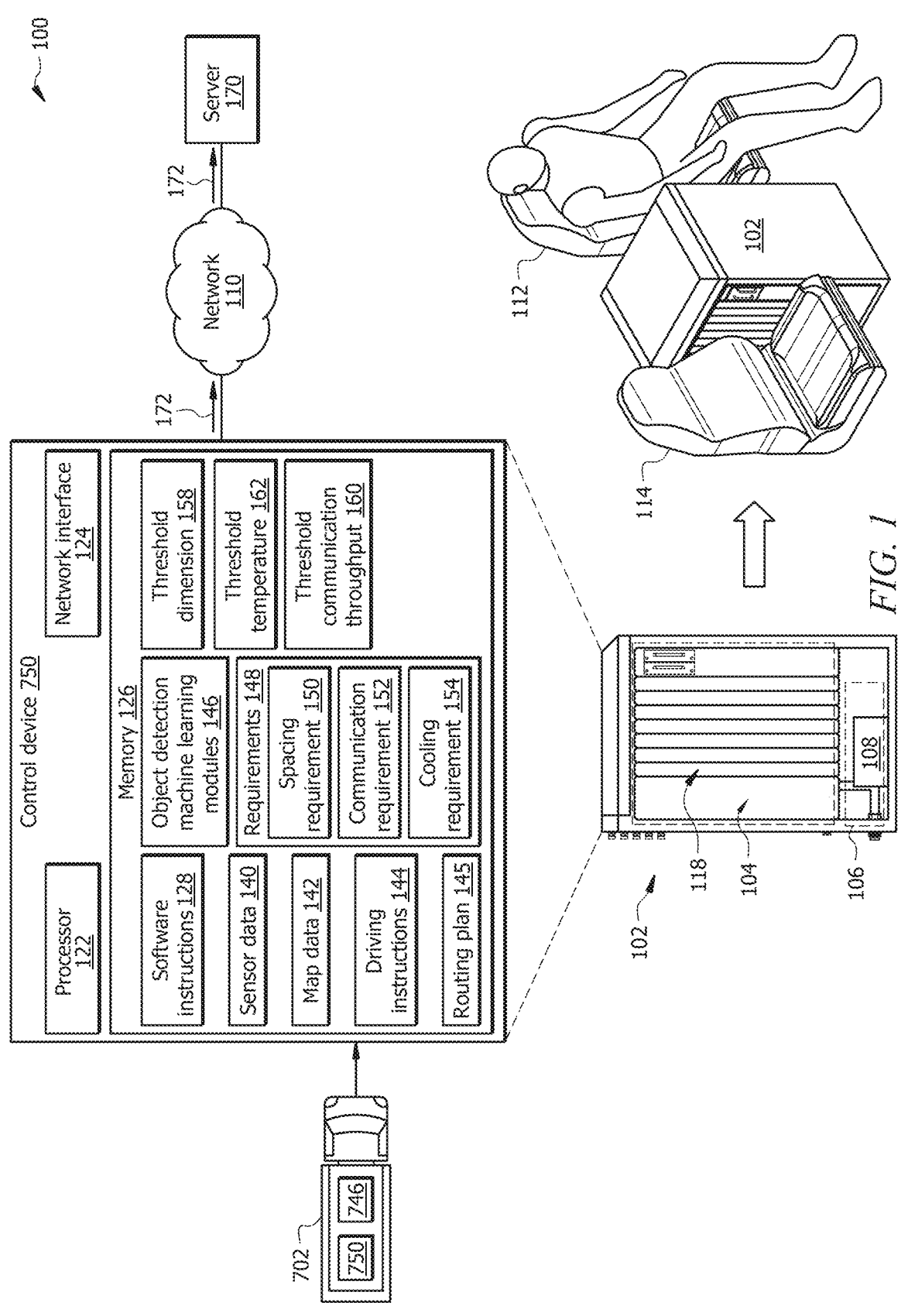
FIG. 1 illustrates an embodiment of a system for implementing a cooling system for an autonomous vehicle of FIG. 7.

FIG. 1 illustrates an embodiment of a system 100 that may be configured to 1) implement a cooling system 106 that is configured to provide appropriate cooling to circuit boards 104 according to various cooling requirements 154 of the circuit boards 104, while meeting the spacing requirement 150; and 2) adapt or update the navigation and/or other operations of an autonomous vehicle 402 in response to feedback from the cooling system 106. In some embodiments, the system 100 comprises an autonomous vehicle 702 communicatively coupled with a server 170 via a network 110. Network 110 enables communications among the components of the system 100. For example, the network 110 allows the autonomous vehicle 702 to communicate with the server and vice versa. An example embodiment of the cooling system 106 is described in FIG. 2. Example embodiments of the enclosure 102 and the cooling system 106 are described in FIG. 3. Example cooling methods, including parallel cooling and series cooling by the cooling system 106 are described in FIGS. 4A and 4B. The cooling system 106 comprises a set of components, among which some of the components (such as pumps 108) are installed inside the enclosure 102 to circulate a liquid coolant through the circuit boards 104. The rest of the components of the cooling system 106 (such as radiators and reservoir) may reside outside the enclosure 102. The components and operations of the cooling system 106 are described further below in conjunction with the discussion of FIGS. 2, 3, 4A and 4B.

The autonomous vehicle 702 comprises a control device 750. The control device 750 is housed within the enclosure 102. The control device 750 is cooled by the cooling system 106. The control device 750 generally facilitates the autonomous operations of the autonomous vehicle 702. The control device 750 comprises one or more processors 122 in signal communication with a memory 126. Memory 126 stores software instructions 128 that when executed by the processor(s) 122 cause the control device 750 to perform one or more operations described herein. In other embodiments, system 100 may not have all of the components listed and/or may have other elements instead of, or in addition to, those listed above. System 100 may be configured as shown or in any other configuration.

In general, the system 100 provides several practical applications, technical improvements, and technical advantages that overcome the previously unmet technical problems in autonomous vehicle technology. These practical applications, technical improvements, and technical advantages are described below. The system 100 is configured to implement the cooling system 106 which is configured to provide appropriate cooling to the circuit boards 104 according to various cooling requirements 154 of the circuit boards 104 while meeting the spacing requirement 150.

One approach to provide cooling to computing devices that facilitate autonomous operations of the autonomous vehicle 702 is to implement a cooling system with automatic or manual valves along the flow path of the coolant to control the flow rate of the coolant flowing through the coolant lines. In such approaches, standard-sized components, such as standard-sized coolant lines, manifolds, and connectors are used for all of the circuit boards and a controller is installed to receive coolant flow rate data and control the valves based on the received coolant flow rate data to adjust the amount of coolant being provided to the circuit boards. However, this approach suffers from several drawbacks. For example, utilizing the standard-sized components increases the overall size of the cooling system. For example, if a circuit board requires a slow flow rate of coolant, the valves along the flow path of the coolant are closed to a certain degree to restrict the flow rate of the coolant. However, in this example, the standard-sized cooling components occupy more space than actually needed. Therefore, in current approaches, the cooling system may not be deployed within a space with predefined and stringent spacing constraints to satisfy the spacing requirements 150. In other words, the overuse of standard-sized cooling components increases the overall size of the cooling system. Consequently, it becomes challenging to deploy the cooling system in spaces with predefined and stringent spacing constraints, which are often essential to meet specific design requirements.

Furthermore, although using the controller to control the valves provides flexibility to control the flow rate of the coolant, current approaches lead to more complex computations to analyze the coolant flow rates in real-time or with acceptable latency which increases potential failure opportunities in providing proper cooling to circuit boards. For example, the complex computations in analyzing and controlling the coolant flow rates via valves lead to providing more cooling than necessary on some occasions and less cooling than required on other occasions. This, in turn, causes the circuit boards to overheat, which reduces the performance and lifespan of the circuit boards. Therefore, using a controller to adjust the coolant flow rate via closing and opening values provides inefficient cooling.

The disclosed system 100 provides a technical solution to this and other technical problems currently arising in the realm of cooling techniques for autonomous vehicles. For example, the disclosed system 100 provides the cooling system 106 whose components are sized according to the required flow rates of the coolant for various circuit boards 104 instead of using valves to control the flow rates of the coolant. Therefore, the flow rate of the coolant is based on the size of the component through which the coolant is flowing instead of manual or automatic control of valves to adjust the flow rate of the coolant. This technique reduces the form factor of the components of the cooling system 106 which leads to allowing the cooling system 106 to meet the spacing requirement 150.

It is also challenging to provide cooling to the electrical components on circuit boards 104 due to the circuit boards 104 being closely spaced. To provide a solution to this and other problems, the disclosed cooling system 106 is configured to operate with liquid coolant. Some examples of liquid coolant may include water, deionized water, glycol/water solutions, and dielectric fluids such as fluorocarbons, among other liquid coolants. Liquid coolant provides more efficient cooling compared to air or air-liquid cooling. Therefore, the disclosed system 100 provides a practical application of providing a more efficient cooling to the control device 750 of an autonomous vehicle 702 by implementing a liquid-coolant-based cooling system 106.

System Components

Network 110 may include any interconnecting system capable of transmitting audio, video, signals, data, messages, or any combination of the preceding. Network 110 may include all or a portion of a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Example Autonomous Vehicle

Figure 7:
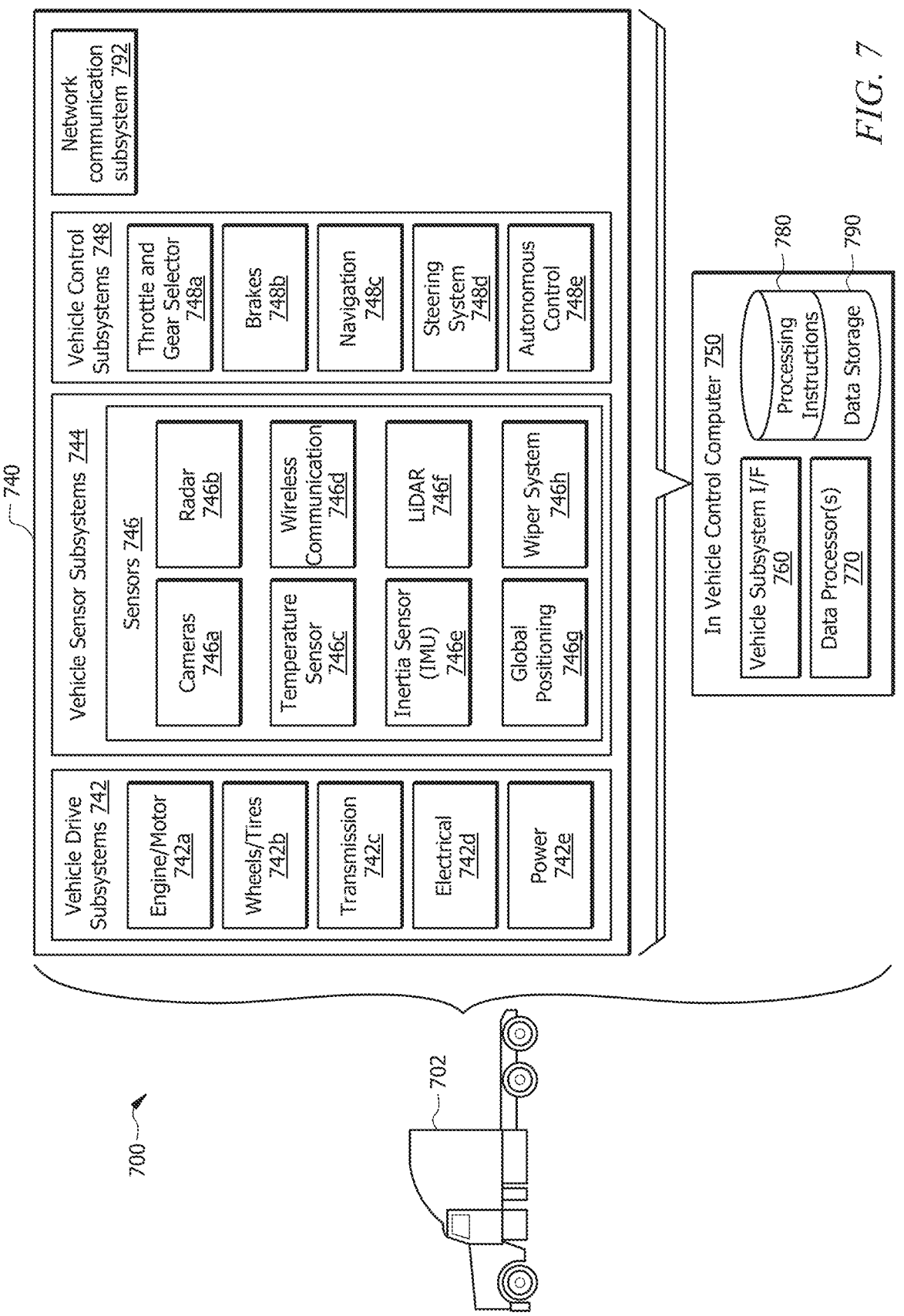
FIG. 7 illustrates a block diagram of an example autonomous vehicle configured to implement autonomous driving operations.

In certain embodiments, the autonomous vehicle 702 may include a semi-truck tractor unit attached to a trailer to transport cargo or freight from one location to another location (see FIG. 7). The autonomous vehicle 702 is generally configured to travel along a road in an autonomous mode. The autonomous vehicle 702 may navigate using a plurality of components described in detail in FIGS. 7-9. The operation of the autonomous vehicle 702 is described in greater detail in FIGS. 7-9. The corresponding description below includes brief descriptions of certain components of the autonomous vehicle 702.

Control device 750 may be generally configured to control the operation of the autonomous vehicle 702 and its components and to facilitate autonomous driving of the autonomous vehicle 702. The control device 750 may be further configured to determine a pathway in front of the autonomous vehicle 702 that is safe to travel and free of objects or obstacles and navigate the autonomous vehicle 702 to travel in that pathway. This process is described in more detail in FIGS. 7-9. The control device 750 may generally include one or more computing devices in signal communication with other components of the autonomous vehicle 702 (see FIG. 7). In this document, the control device 750 may interchangeably be referred to as an in-vehicle control computer 750.

The control device 750 may be configured to detect objects on and around a road traveled by the autonomous vehicle 702 by analyzing the sensor data 140 and/or map data 142. For example, the control device 750 may detect objects on and around the road by implementing object detection machine learning modules 146. The object detection machine learning modules 146 may be implemented using neural networks and/or machine learning algorithms for detecting objects from images, videos, infrared images, point clouds, audio feed, Radar data, etc. The object detection machine learning modules 146 are described in more detail below. The control device 750 may receive sensor data 140 from the sensors 746 positioned on the autonomous vehicle 702 to determine a safe pathway to travel. The sensor data 140 may include data captured by the sensors 746.

Sensors 746 may be configured to capture any object within their detection zones or fields of view, such as landmarks, lane markers, lane boundaries, road boundaries, vehicles, pedestrians, road/traffic signs, among others. In some embodiments, the sensors 746 may be configured to detect rain, fog, snow, and/or any other weather condition. The sensors 746 may include a detection and ranging (LiDAR) sensor, a Radar sensor, a video camera, an infrared camera, an ultrasonic sensor system, a wind gust detection system, a microphone array, a thermocouple, a humidity sensor, a barometer, an inertial measurement unit, a positioning system, an infrared sensor, a motion sensor, a rain sensor, and the like. In some embodiments, the sensors 746 may be positioned around the autonomous vehicle 702 to capture the environment surrounding the autonomous vehicle 702. See the corresponding description of FIG. 3 for further description of the sensors 746.

Example Control Device

The control device 750 is described in greater detail in FIG. 7. In brief, the control device 750 may include the processor(s) 122 in signal communication with the memory 126 and a network interface 124. The processor(s) 122 may include one or more processing units that perform various functions described herein. The memory 126 may store any data and/or instructions used by the processor(s) 122 to perform its functions. For example, the memory 126 may store software instructions 128 that when executed by the processor(s) 122 causes the control device 750 to perform one or more functions described herein.

The processor 122 may be one of the data processors 670 described in FIG. 7. The processor 122 comprises one or more processors. The processor 122 may be any electronic circuitry, including state machines, one or more central processing unit (CPU) chips, logic units, cores (e.g., a multi-core processor), field-programmable gate arrays (FP-GAs), application-specific integrated circuits (ASICs), or digital signal processors (DSPs). The processor 122 may be a programmable logic device, a microcontroller, a micro-processor, or any suitable combination of the preceding. The processor 122 may be communicatively coupled to and in signal communication with the network interface 124 and memory 126. The one or more processors may be configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors may be configured to implement various instructions. For example, the one or more processors may be configured to execute software instructions 128 to implement the functions disclosed herein, such as some or all of those described with respect to FIGS. 1-8. In some embodiments, the function described herein is implemented using logic units, FPGAs, ASICs, DSPs, or any other suitable hardware or electronic circuitry.

The network interface 124 may be a component of the network communication subsystem 692 described in FIG. 7. The network interface 124 may be configured to enable wired and/or wireless communications. The network interface 124 may be configured to communicate data between the autonomous vehicle 702 and other devices, servers 170, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol as would be appreciated by one of ordinary skill in the art.

The memory 126 may be one of the data storages 690 described in FIG. 7. The memory 126 may be volatile or non-volatile and may comprise read-only memory (ROM), random-access memory (RAM), ternary content-address-able memory (TCAM), dynamic random-access memory (DRAM), and static random-access memory (SRAM). The memory 126 may include one or more of a local database, cloud database, network-attached storage (NAS), etc. The memory 126 may store any of the information described in FIGS. 1-8 along with any other data, instructions, logic, rules, or code operable to implement the function(s) described herein when executed by processor 122. For example, the memory 126 may store software instructions 128, sensor data 140, map data 142, driving instructions 144, routing plan 145, object detection machine learning modules 146, requirements 148, flow rate data 250a and 250b, minimum flow rate 258, and/or any other data/instructions. The software instructions 128 include code that when executed by the processor(s) 122 causes the control device 750 to perform the functions described herein, such as some or all of those described in FIGS. 1-8. The memory 126 comprises one or more disks, tape drives, or solid-state drives, and may be used as an over-flow data storage device to store programs when such programs are selected for execution, and to store instructions and data that are read during program execution.

Map data 142 may include a virtual map of a city or an area that includes the road traveled by an autonomous vehicle 702. In some examples, the map data 142 may include the map database 858 and map database 836 (see FIG. 8 for descriptions of the map database 858 and map database 836). The map data 142 may include drivable areas, such as roads, paths, highways, and undrivable areas, such as terrain (determined by the occupancy grid module 860, see FIG. 8 for descriptions of the occupancy grid module 860). The map data 142 may specify location coordinates of road signs, lanes, lane markings, lane boundaries, road boundaries, traffic lights, obstacles, etc.

Figure 8:
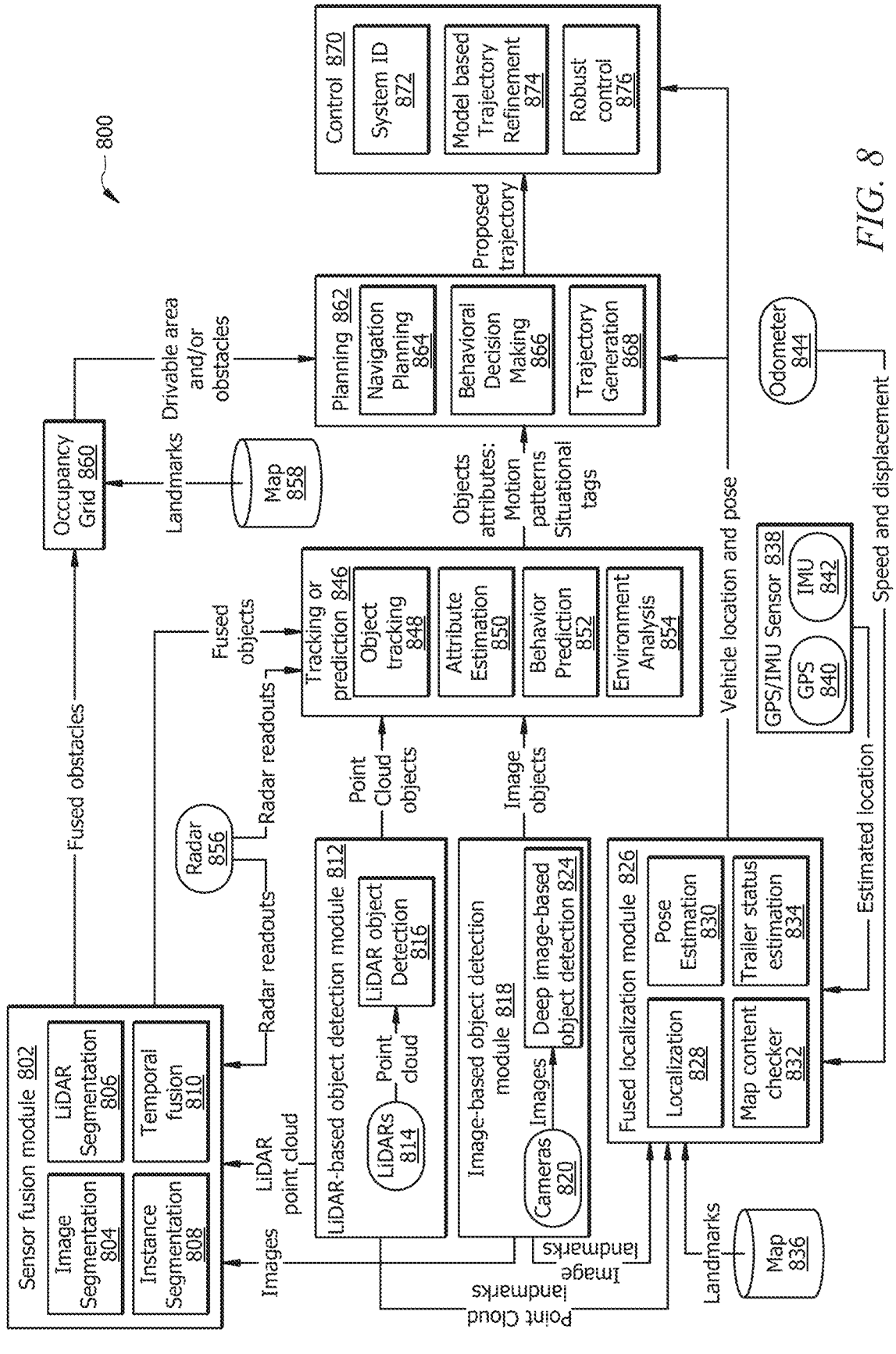
FIG. 8 illustrates an example system for providing autonomous driving operations used by the autonomous vehicle of FIG. 7.

Driving instructions 144 may be implemented by the planning module 862 (See descriptions of the planning module 862 in FIG. 8). The driving instructions 144 may include instructions and rules to adapt the autonomous driving of the autonomous vehicle 702 according to the driving rules of each stage of the routing plan 145. For example, the driving instructions 144 may include instructions to stay within the speed range of a road traveled by the autonomous vehicle 702, adapt the speed of the autonomous vehicle 702 with respect to observed changes by the sensors 746, such as speeds of surrounding vehicles, objects within the detection zones of the sensors 746, etc.

Routing plan 145 may be a plan for traveling from a start location (e.g., a first autonomous vehicle launchpad/landing pad) to a destination (e.g., a second autonomous vehicle launchpad/landing pad). For example, the routing plan 145 may specify a combination of one or more streets, roads, and highways in a specific order from the start location to the destination. The routing plan 145 may specify stages, including the first stage (e.g., moving out from a start location/launch pad), a plurality of intermediate stages (e.g., traveling along particular lanes of one or more particular street/road/highway), and the last stage (e.g., entering the destination/landing pad). The routing plan 145 may include other information about the route from the start position to the destination, such as road/traffic signs in that routing plan 145, etc.

Object detection machine learning modules 146 may be implemented by the processor 122 executing software instructions 128, and may be generally configured to detect objects and obstacles from the sensor data 140. The object detection machine learning modules 146 may be implemented using neural networks and/or machine learning algorithms for detecting objects from any data type, such as images, videos, infrared images, point clouds, audio feed, Radar data, etc.

In some embodiments, the object detection machine learning modules 146 may be implemented using machine learning algorithms, such as Support Vector Machine (SVM), Naive Bayes, Logistic Regression, k-Nearest Neighbors, Decision Trees, or the like. In some embodiments, the object detection machine learning modules 146 may utilize a plurality of neural network layers, convolutional neural network layers, Long-Short-Term-Memory (LSTM) layers, Bi-directional LSTM layers, recurrent neural network layers, and/or the like, in which weights and biases of these layers are optimized in the training process of the object detection machine learning modules 146. The object detection machine learning modules 146 may be trained by a training dataset that may include samples of data types labeled with one or more objects in each sample. For example, the training dataset may include sample images of objects (e.g., vehicles, lane markings, pedestrians, road signs, obstacles, etc.) labeled with object(s) in each sample image. Similarly, the training dataset may include samples of other data types, such as videos, infrared images, point clouds, audio feed, Radar data, etc., labeled with object(s) in each sample data. The object detection machine learning modules 146 may be trained, tested, and refined by the training dataset and the sensor data 140. The object detection machine learning modules 146 use the sensor data 140 (which are not labeled with objects) to increase their accuracy of predictions in detecting objects. Similar operations and embodiments may apply for training the object detection machine learning modules 146 using the training dataset that includes sound data samples each labeled with a respective sound source and a type of sound. For example, supervised and/or unsupervised machine learning algorithms may be used to validate the predictions of the object detection machine learning modules 146 in detecting objects in the sensor data 140.

Example Modular Enclosure

The modular enclosure 102 may be a physical structural component that is configured to house the set of circuit boards 104. The circuit boards 104 are deployed on the blades 118. The control device 450 consists of the circuit boards 104. The enclosure 102 is further configured to meet a set of requirements 148. The set of requirements 148 may include a space requirement 150, a communication requirement 152, and a cooling requirement 154.

The space requirement 150 may indicate that the enclosure 102 to have a dimension less than a threshold dimension 158. In other words, the space requirement 150 may indicate that the enclosure 102 should occupy less than the threshold dimension 158 in the physical space. In one example, the threshold dimension 158 may be 36 inches×24 inches×22 inches. In the same or other examples, the threshold dimension 158 may be any suitable dimension that can fit between the driver seat 112 and the passenger seat 114 in a semi-tractor truck and has a height less than a shoulder-level height of a driver (while sitting in the driver seat 112) to allow the driver to view outside the vehicle from side and back windows. In certain embodiments, the enclosure 102 is configured to fit within a threshold volume of space. For example, the enclosure 102 may be configured to fit between a driver seat 112 and a passenger seat 114 in a cabin of the autonomous vehicle 702.

The communication requirement 152 may indicate to provide at least a threshold communication throughput 160 among the circuit boards 104, between the circuit boards 104 and the external devices, such as the server 170, between the circuit boards 104 and other components of the autonomous vehicle 702, and among the circuit boards 104. For example, the communication requirement 152 may be met by transmission lines, cables, and bus wires capable of transmitting data with at least the threshold communication throughput 160. The communication throughput 160 may be referred to as data bitrate. In certain embodiments, the communication requirement 152 may also indicate to supply power (and voltage) signals to the circuit boards 104 to maintain the circuit boards of the circuit boards 104 operational. In certain embodiments, the communication requirement 152 may also indicate to maintain signal integrity more than a threshold signal integrity, such as a threshold jitter noise, a threshold data package loss, a threshold signal bandwidth, and the like for the data communications of the circuit boards 104. The cooling requirement 154 may indicate to satisfy a threshold temperature 162 within the enclosure 102. The threshold temperature 162 may be 18 degrees (° C.), 22 degrees (° C.), and the like.

The cooling system 106 is configured to satisfy the cooling requirement 154 and space requirements 150. The cooling system 106 is described in more detail in FIGS. 2, 3, 4A, and 4B.

Example Cooling System

Figure 2:
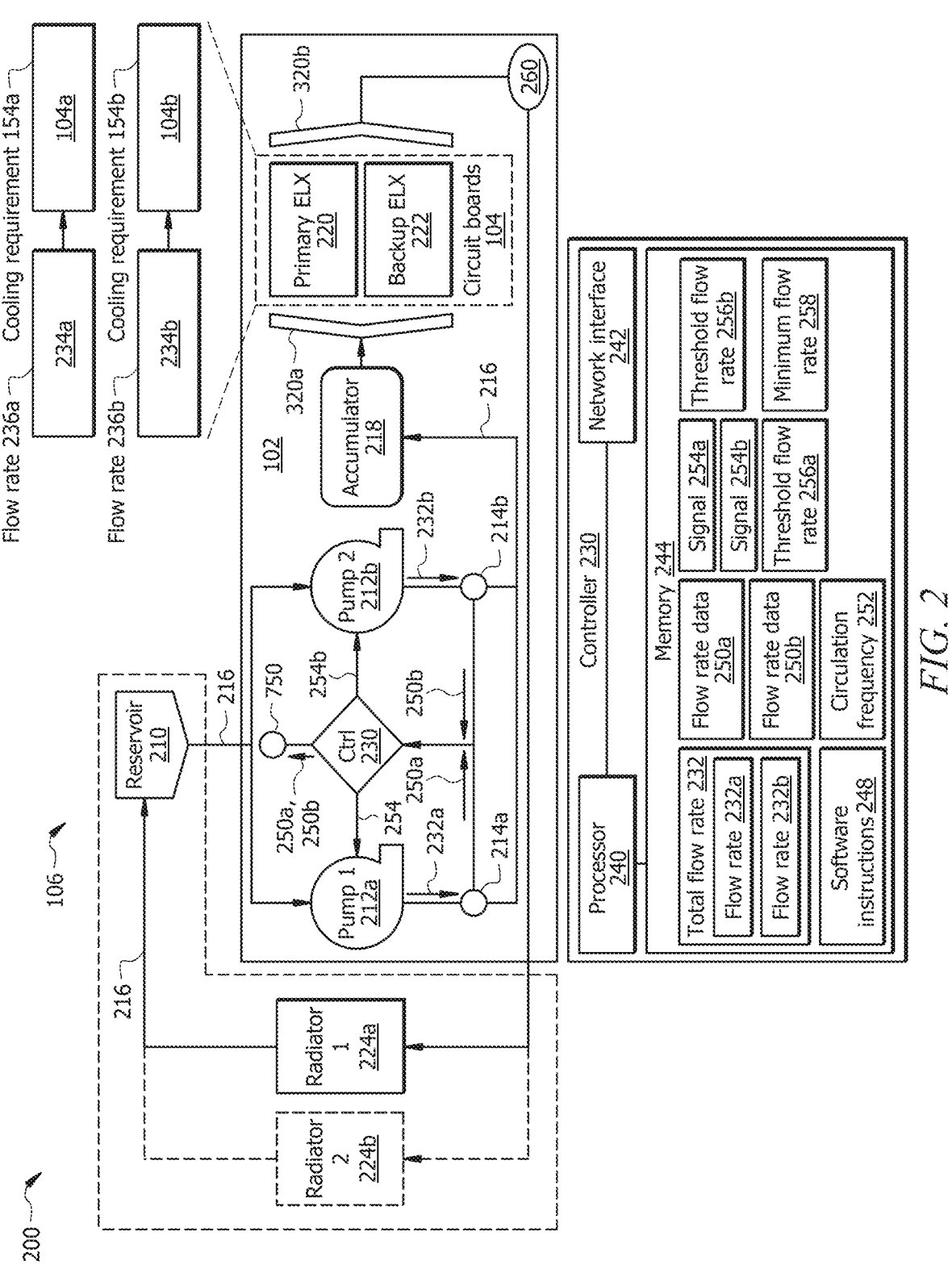
FIG. 2 illustrates a simplified schematic block diagram of a cooling system of the autonomous vehicle of FIG. 7.

FIG. 2 illustrates a simplified schematic block diagram 200 of the cooling system 106. The cooling system 106 includes a set of components configured to provide cooling to the circuit boards 104 to satisfy the cooling requirement 154. In the example of FIG. 2, the cooling system 106 includes the reservoir 210, pumps 212a and 212b, flow rate sensors 214a and 214b, controller 230, accumulator 218, primary electronic components 220, backup electronic components 222, one or more radiators 224a-b, and liquid lines and tubes 216. The operation of the cooling system 106 is described below.

In operation, the cooling system 106 is configured to provide the liquid coolant to intake manifolds 320a through which the liquid coolant flows toward one or more circuit boards 104, circulate the liquid coolant through the circuit boards 104, absorbs the heat from the circuit boards 104 (via the liquid coolant), receive the warmed liquid coolant from the circuit boards 104, flow the warmed liquid coolant toward radiator(s) 224a, b, receive cooled liquid coolant from the radiator(s) 224a, b, flow the cooled liquid coolant toward the reservoir 210, and flow the cooled liquid coolant toward the pumps 212a, b for the next circulation.

The cooled liquid coolant is generally maintained in the reservoir 210. The cooling system 106 circulates the cooled liquid coolant through the primary electronic components 220 and backup electronic components 222 to remove heat from them. A circulation of the liquid coolant may begin when the liquid coolant is at the reservoir 210. The cooling system 106 may circulate the coolant from the reservoir 210 to the pumps 212a and 212b via tubes 216. The pumps 212a and 212b may cause the coolant to flow towards the accumulator 218. The accumulator 218 may stabilize the flow rate of the coolant and cause the coolant to flow through the primary electronic components 220 and backup electronic components 222. When the cooled liquid coolant travels through the primary electronic components 220 and backup electronic components 222, it picks up heat from the electrical components 220, 222. The warmed coolant flows towards the radiator(s) 224a-b. While at the radiator(s) 224a-b, the coolant is exposed to ambient air and its temperature is reduced. The cooled coolant flows back into the reservoir 210. This circulation may continue with a circulation frequency 252 that is set and controlled by the control device 750 and/or the controller 230. This operation is described in greater detail below.

The reservoir 210 may generally be a tank that is configured to store the coolant and any other liquid. In some embodiments, the reservoir 210 may be placed outside of the enclosure 102 (see FIG. 1).

Example Pumps

Each pump 212a and 212b may be an automotive-grade pump and configured to facilitate the flow of the coolant from the reservoir 210 to other components of the cooling system 106. In some embodiments, each pump 212a and 212b may operate in half of or less than (such as 40%, 50%, 60%, etc.) a maximum duty cycle of the operation of the pump 212a and 212b. In other words, in some embodiments, each pump 212a and 212b may operate at half of or less than (such as 40%, 50%, 60%, etc.) a maximum speed of the respective pump 212a and 212b to propel the coolant toward the accumulator 218. Not operating the pumps 212a and 212b at their maximum capability leads to prolonging their lifespan. In other words, operating the pumps 212a and 212b at a relaxed speed (e.g., at half of the maximum speed)

reduces the physical damages, and wear and tear that come with operating the pumps 212a and 212b at the maximum speed.

In some embodiments, each pump 212a and 212b may be a redundant pump for the other pump 212a and 212b. For example, in some embodiments, if a first pump 212a fails or cannot produce a threshold coolant flow rate 256a, the second pump 212b may operate at a higher or full-duty cycle capacity (e.g., at near maximum speed) to compensate for the slow flow rate at the first pump 212a. In other words, in some embodiments, if the coolant flow rate at the first pump 212a is determined to be slow (such as less than a predefined threshold flow rate 256a), the controller 230 may send a signal that instructs the second pump 212b to increase the speed of the pump 212b to compensate for the slow flow rate at the first pump 212a.

Example Flow Rate Sensor

Each flow rate sensor 214a and 214b may be or include a sensor circuitry configured to detect the flow rate 232a and 232b of the liquid coolant, respectively. For example, each flow rate sensor 214a and 214b may include mechanical and/or electrical components configured to detect the velocity of the coolant. The flow rate sensor 214a and 214b may be positioned along a flow path of the coolant at the outlet of the pumps 210a-b, respectively. For example, the flow rate sensor 214a may be located adjacent to the pump 212a and along the flow path of the coolant at the outlet of the pump 212a, and flow rate sensor 214b may be located adjacent to the pump 212b and along the flow path of the coolant at the outlet of the pump 212b.

In some embodiments, the flow rate sensors 214a and 214b may be configured to use sensing methods, such as ultrasonic, electromagnetic, thermal techniques to measure the velocity of the coolant's flow rate. The flow rate sensor 214a and 214b may then convert this velocity measurement into an actual flow rate 232a and 232b, typically in units of volume per unit of time (e.g., liters per minute, gallons per minute, etc.). The flow rate sensor 214a and 214b may communicate flow rate data 250a and 250b, respectively, to the controller 230. The flow rate data 250a includes the detected values of the flow rate 232a, and the flow rate data 250b includes the detected values of the flow rate 232b. Each flow rate sensor 214a and 214b may communicate the respective flow rate data 25a-b to the controller 230 continuously, periodically (e.g., every minute, every thirty seconds, etc.), or on demand.

Example Accumulator

As shown in FIG. 2, the coolant flows from the pumps 212a and 212b towards the accumulator 218 via the liquid tubes 216. The accumulator 218 may include a tank that is configured to store the coolant. The accumulator 218 is configured to absorb the various flow rates of the coolant and provide the coolant with a consistent and steady flow rate to the circuit boards 104. To absorb and provide a consistent and steady coolant flow rate, the accumulator 218 may utilize an output port or bladder that is configured to restrict the flow rate of the liquid coolant to a steady state flow rate. The flow rates 232a and 232b of the coolant from the respective pumps 212a and 212b may fluctuate due to various factors such as changes in temperature, and blockage at an outlet of pump 212a and 212b, among other factors. Therefore, the accumulator 218 may act as a buffer for the flow rate variations to regulate the flow rate of the coolant. The accumulator 218 flows the liquid coolant through the intake manifolds 320a toward the circuit boards 104 that correspond to the primary electrical components 220 and backup electrical components 222.

Example Primary and Back Up Electronic Circuits

The primary electrical components 220 and backup electrical components 222 may correspond to the circuit boards 104. The primary electrical components 220 and backup electrical components 222 may be redundant with each other. Each of the primary electrical components 220 and backup electrical components 222 may be configured to perform one or more operations of the autonomous vehicle 702. In cases where a primary component from the primary electrical component 220 fails, the counterpart backup component from the backup electrical component 222 may be activated to perform the operations of the failed primary component. In some embodiments, one or more primary electrical components 220 and one or more counterpart backup electrical components 222 may be implemented on the same blades 118 (see FIG. 1). In some embodiments, one or more primary electrical components 220 and one or more counterpart backup electrical components 222 may be implemented on different blades 118 (see FIG. 1).

In the example of FIG. 2, two circuit boards 104a and 104b of the primary electrical components 220 are shown. However, it is understood that the primary electrical components 220 may include any number of circuit boards 104. Similarly, the backup electrical components 222 may include counterpart circuit boards 104.

Each circuit board 104 may be provided with a cooling subsystem 234. In the present document, the cooling subsystem 234 may be referred to as a cooling configuration that is installed or implemented on circuit board 104 to provide cooling to the circuit board 104. The cooling provided to each circuit board 104 may be metered by the respective cooling subsystem 234. In the example of circuit boards 104a and 104b, the circuit board 104a is provided with the cooling subsystem 234a, and the circuit board 104b is provided with the cooling subsystem 234b. Each cooling subsystem 234a and 234b may include a set of components that is configured to provide or circulate the liquid coolant with a predefined flow rate to the respective circuit board 104a and 104b. In other words, each cooling subsystem 234a and 234b is designed specifically for the respective circuit board 104a and 104b to provide cooling to the respective circuit board 104a and 104b according to the particular cooling requirement 154a-b of the respective circuit board 104a and 104b. For example, the first cooling subsystem 234a is configured to provide cooling to the first circuit board 104a according to the first cooling requirement 154a of the first circuit board 104a to provide the coolant with the first flow rate 236a. The first cooling requirement 154a may indicate maintaining a temperature less than the first threshold temperature (such as a temperature less than 20 degrees, 15 degrees, etc.) at the first circuit board 104a. The first cooling requirement 154a may be defined so that the first circuit board 104a can perform its operations with at least a threshold performance level (such as at least 80%, 85%, performance level). For example, assume that the first circuit board 104a is configured to perform a first set of operations that requires a first amount of computing resources. Therefore, in this example, the first cooling requirement 154a may be defined so that the first set of operations is performed with at least the threshold performance level.

Example Cooling Subsystems

The first cooling subsystem 234a may include a set of liquid lines, manifolds, heat sinks, and connectors to provide the coolant with the first flow rate 236a to the first circuit board 104a. Therefore, the first cooling subsystem 234a may be configured with the first physical attributes that include a size of each manifold, a length of each liquid line, a radius of each liquid line, and a size of each heat sink, among other attributes.

In another example, the second cooling subsystem 234b is configured to provide cooling to the second circuit board 104b according to the second cooling requirement 154b of the second circuit board 104b to provide the coolant with the second flow rate 236b. The second cooling requirement 154b may indicate maintaining a temperature less than a second threshold temperature (such as a temperature less than 20 degrees, 15 degrees, etc.) at the second circuit board 104b. For example, assume that the second circuit board 104b is configured to perform a second set of operations that requires a second amount of computing resources. Therefore, in this example, the second cooling requirement 154b may be defined so that the second set of operations is performed with at least the threshold performance level.

The second cooling requirement 154b may be defined so that the second circuit board 104b can perform its operations with at least a threshold performance level (such as, at least 80%, 85%, performance level). The second cooling subsystem 234b may include a set of liquid lines, manifolds, heat sinks, and connectors to provide the coolant with the second flow rate 236b to the second circuit board 104b. Therefore, the second cooling subsystem 234b may be configured with second physical attributes that include a size of each manifold, a length of each liquid line, a radius of each liquid line, and a size of each heat sink, among other attributes. In some embodiments, the physical attributes of the cooling subsystem 234a may be different from the physical attributes of the cooling subsystem 234b.

In this manner, each of the cooling subsystems 234a and 234b is configured with respective physical attributes to provide cooling to the respective circuit board 104a and 104b according to the respective cooling requirements 1540ab of the respective circuit boards 104a and 104b. In other words, the cooling requirements 1542a-b dictates the flow rate of the coolant which, in turn, dictates the design and dimension of the cooling subsystems 234a and 234b for respective circuit board 104a and 104b. Example embodiments of the cooling subsystems 234a and 234b with circuit boards 104a and 104b are described in FIGS. 4A-B.

Example Radiators

After the coolant is circulated among the circuit boards 104, the coolant flows through the exhaust manifolds 320b and liquid tubes 216 towards the radiator 224a-b. In some embodiments, a single radiator 224a may be used. For example, in some embodiments, as a design choice, a single large radiator 224a may be used instead of two smaller radiators 224a-b. The radiator 224a-b is positioned downstream of the circuit boards 104. The radiator 224a-b may expose the warmed coolant to ambient air. The heat from the warmed coolant is transferred to the air, causing the temperature of the coolant to drop.

In some embodiments, each radiator 224a-b may include a finned structure that increases the surface area to increase the heat dissipation from the finned structure. For example, each radiator 224a-b may include aluminum fins with copper tubing running through the fins, and a DC fan mounted adjacent to the fins. The coolant flows through the tubes. The fan pulls air through the fins and allows the heat from the coolant running thought the tubes to be dissipated into the air.

In some embodiments, the radiator 224a-b may be mounted outside of the cabin of the autonomous vehicle 702 to have access to ambient air more easily, regardless of the time of day, operating temperature, moving or stopped autonomous vehicle 702. For example, the radiator 224*a-b* may be mounted between the cabin and the trailer of the autonomous vehicle 702.

After the coolant is cooled, it flows through the liquid tubes 116 towards the reservoir 210 until the next circulation begins. This coolant circulation frequency 252 may be set and determined by the controller 230 and/or processor 122 to satisfy the cooling requirements 154 of the circuit board 104. In this process, the controller 230 and/or the processor 122 may determine the circulation frequency 252 of the coolant to satisfy the cooling requirements 154*a-b*. The controller 230 may determine a first speed of the pump 212*a* and a second speed of the pump 212*b* that lead to and is associated with the determined circulation frequency 252 of the coolant. In this manner, the cooling system 106 may adapt the coolant circulation frequency 252 to satisfy the cooling needs of the circuit boards 104, facilitating a more optimal temperature control and performance.

Example Controller

The controller 230 may be configured to provide a prescribed speed of operation to each pump 212*a* and 212*b*. To this end, the controller 230 may set the flow rates 232*a* and 232*b* for each respective pump 212*a* and 212*b*. For example, to set the flow rate 232*a* of the coolant out of the pump 212*a*, the controller 230 may communicate a first signal 254*a* that indicates the operating speed of the pump 212*a* to the pump 212*a*. In response, the pump 212*a* may operate at the indicated speed. Similarly, to set the flow rate 232*b* of the coolant flowing out of the pump 212*b*, the controller 230 may communicate a second signal 254*b* that indicates the operating speed of the pump 212*b* to the pump 212*b*. In response, the pump 212*b* may be operated at the indicated speed.

The controller 230 may include a processor 240 in signal communication with a network interface 242 and a memory 244. Processor 240 comprises one or more processors. The processor 240 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 240 may be a programmable logic device, a microcontroller, a microprocessor, or any suitable combination of the preceding. The one or more processors are configured to process data and may be implemented in hardware or software. For example, the processor 240 may be 8-bit, 16-bit, 32-bit, 64-bit, or of any other suitable architecture. The processor 240 may include an arithmetic logic unit (ALU) for performing arithmetic and logic operations, processor 240 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 248) to implement the operations of the processor 240. In this way, processor 240 may be a special-purpose computer designed to implement the functions disclosed herein. In an embodiment, the processor 240 is implemented using logic units, FPGAs, ASICs, DSPs, or any other suitable hardware. The processor 240 is configured to operate as described in FIGS. 1-8. For example, the processor 240 may be configured to perform one or more operations of the cooling system 106 described in FIGS. 1, 2, 3, 4A, and 4B, and one or more operations of method 500 as described in FIG. 5.

Network interface 242 is configured to enable wired and/or wireless communications. The network interface 242 is configured to communicate data between the controller 230 and other devices, control device 750 (see FIGS. 1 and 6), databases, systems, and domains. For example, the network interface 242 may comprise a WIFI interface, a local area network (LAN) interface, a wide area network (WAN) interface, a modem, a switch, or a router. The processor 240 is configured to send and receive data using the network interface 242. The network interface 242 may be configured to use any suitable type of communication protocol as would be appreciated by one of ordinary skill in the art.

Memory 244 may be a non-transitory computer-readable medium. The memory 244 may be volatile or non-volatile and may comprise a read-only memory (ROM), random-access memory (RAM), ternary content-addressable memory (TCAM), dynamic random-access memory (DRAM), and static random-access memory (SRAM). Memory 244 may be implemented using one or more disks, tape drives, solid-state drives, and/or the like. Memory 244 is operable to store the software instructions 248, flow rates 232 which includes the flow rates 232*a* and 232*b*, flow rate data 250*a* and 250*b*, circulation frequency 252, signals 254*a* and 254*b*, threshold flow rates 256*a* and 256*b*, minimum flow rate 258, and/or any other data or instructions. The software instructions 208 may comprise any suitable set of instructions, logic, rules, or code operable to execute the operations of the processor 240.

The controller 230 may be communicatively coupled with the pumps 212*a* and 212*b*, flow rate sensors 214*a* and 214*b*, and the control device 750 (see FIGS. 1 and 6). The controller 230 may be configured to operate the pump(s) 212*a* and 212*b* to direct the liquid coolant from the pump(s) 212*a* and 212*b* towards the circuit boards 104*a* and 104*b* to satisfy the respective cooling requirements 234*a* and 234*b*. In this process, the controller 230 may receive the flow rate data 250*a* and 250*b* from the flow rate sensors 214*a* and 214*b*, respectively. The flow rate data 250*a* and 250*b* may include the detected flow rates 232*a* and 232*b*, respectively. The controller 230 may send signals 252*a* and 252*b* to the pumps 212*a* and 212*b* to control the flow rates 232*a* and 232*b* of the coolant flowing out of the pumps 212*a* and 212*b*, respectively. This process is described in greater detail below.

Operational Flow for Controlling the Pumps

The operational flow of the controller 230 for controlling the pumps 212*a* and 212*b* may begin when the controller 230 receives the flow rate data 250*a* and 250*b* from the flow rate sensors 214*a* and 214*b*, respectively. The flow rate data 250*a* and 250*b* may include data indicating the respective flow rates 232*a* and 232*b*. For example, the controller 230 may receive the flow rate data 250*a* from the flow rate sensor 214*a*, where the flow rate data 250*a* indicates the flow rate 232*a* of the coolant at the outlet of the pump 212*a*, and receive the flow rate data 250*b* from the flow rate sensor 214*b*, where the flow rate data 250*b* indicates the flow rate 232*b* of the coolant at the outlet of the pump 212*b*.

The controller 230 may compare the flow rate 232*a* with the threshold flow rate 256*a*, and compare the flow rate 232*b* with the threshold flow rate 256*b*. If the controller 230 determines that the received flow rates 232*a* and 232*b* correspond to or are less than the threshold flow rate 256*a* and 256*b*, the controller 230 may determine that the pumps 212*a* and 212*b* are operating as expected and the cooling requirements 154a-b of the circuit board 104a and 104b are met. If, on the other hand, the controller 230 determines that at least one of the received flow rates 232a and 232b does not correspond or is more than the respective threshold flow rate 256a and 256b, the controller 230 may determine that respective pump(s) 212a and 212b is not operating as expected.

In some cases, a pump 212a and 212b may have a malfunction, such as a hardware malfunction or a blockage, that causes the pump 212a and 212b to have a flow rate 232a and 232b that is less than the respective threshold flow rate 256a and 256b. In an example scenario, assume that the controller 230 receives the flow rate data 250a from the flow rate sensor 214a, and that the flow rate data 250a indicates that the flow rate 232a is less than the threshold flow rate 256a. In response, the controller 230 may communicate a signal 254 that indicates to increase the speed of the pump 212b to compensate for the slow flow rate 232a at the pump 212a. In some embodiments, the controller 230 may instruct any of the pumps 212a and 212b to dynamically adjust the respective flow rates 232a and 232b of the coolant coming out of the pumps 212a and 212b to have compensate for a slow flow rate at a given pump 212a and 212b.

Adapting Autonomous Vehicle's Navigation Based on Feedback from the Cooling System In cases where both pumps 212a and 212b have a malfunction, the total flow rate 232 of the coolant may be less than desired to satisfy the cooling requirements 154a-b. For example, assume that the controller 230 receives the flow rate data 250a and 250b from the flow rate sensors 214a and 214b, respectively, similar to that described above. The controller 230 may forward the flow rate data 250a and 250b to the control device 750.

In some embodiments, the control device 750 may compare each of the flow rates 232a and 232b with the respective threshold flow rate 256a and 256b to determine whether a pump 212a and 212b is operating as expected to provide the coolant with the expected flow rate 232a and 232b. In some embodiments, the control device 750 may accumulate or add the flow rates 232a and 232b to determine the total flow rate 232 and compare the total flow rate 232 of the coolant with the minimum flow rate 258. The minimum flow rate 258 may be a minimum flow rate of the coolant from both pumps 212a and 212b so that the cooling requirement 154a-b is met.

If the processor 122 determines that the total flow rate 232 is less than the minimum flow rate 258, the control device 750 may perform one or more actions. For example, the control device 750 may cause the autonomous vehicle 702 to perform a minimal risk maneuver by sending instruction signals or commands to one or more vehicle subsystems 740 (see FIG. 7). Some examples of the minimal risk maneuver may include slowing down or reducing the traveling speed of the autonomous vehicle 702, stopping the autonomous vehicle 702, pulling over the autonomous vehicle 702 on a side of the road, taking a detour to another route that puts less stress on the internal components of the autonomous vehicle 702 and the cooling system 106, among other alterations to the navigation of the autonomous vehicle 702.

In some embodiments, the control device 750 may communicate a signal 172 to the server 170 at the destination terminal, where the signal 172 indicates that the pump(s) 212a and 212b that is determined to provide the slow flow rate 232a and 232b needs to be serviced.

In some embodiments, the controller 230 may communicate a signal 254a and 254b to a pump 212a and 212b to adjust the speed of the pump 212a and 212b if the temperature of the liquid coolant flown through the exhaust manifold 320b is more than a threshold temperature 162. For example, the controller 230 may detect the temperature of the liquid coolant flowing from the exhaust manifold 320b by a temperature sensor 260 located along a flow path of the liquid coolant flowing inside the exhaust manifold 320b. For example, the temperature sensor 260 may detect and communicate the temperate of the liquid coolant to the controller 230 via wires or wireless communication. The controller 230 may determine whether the detected temperature of the liquid coolant is more than the threshold temperature 162 (see FIG. 1). If it is determined that the detected temperature is more than the threshold temperature 162 (see FIG. 1), the controller 230 may communicate one or more signals 254a and 254b to one or more pumps 212a and 212b, respectively, where each signal 254a and 254b indicates to increase the speed of the respective pump 212a and 212b to increase the combined flow rate 232 of the liquid coolant.

Figure 3:
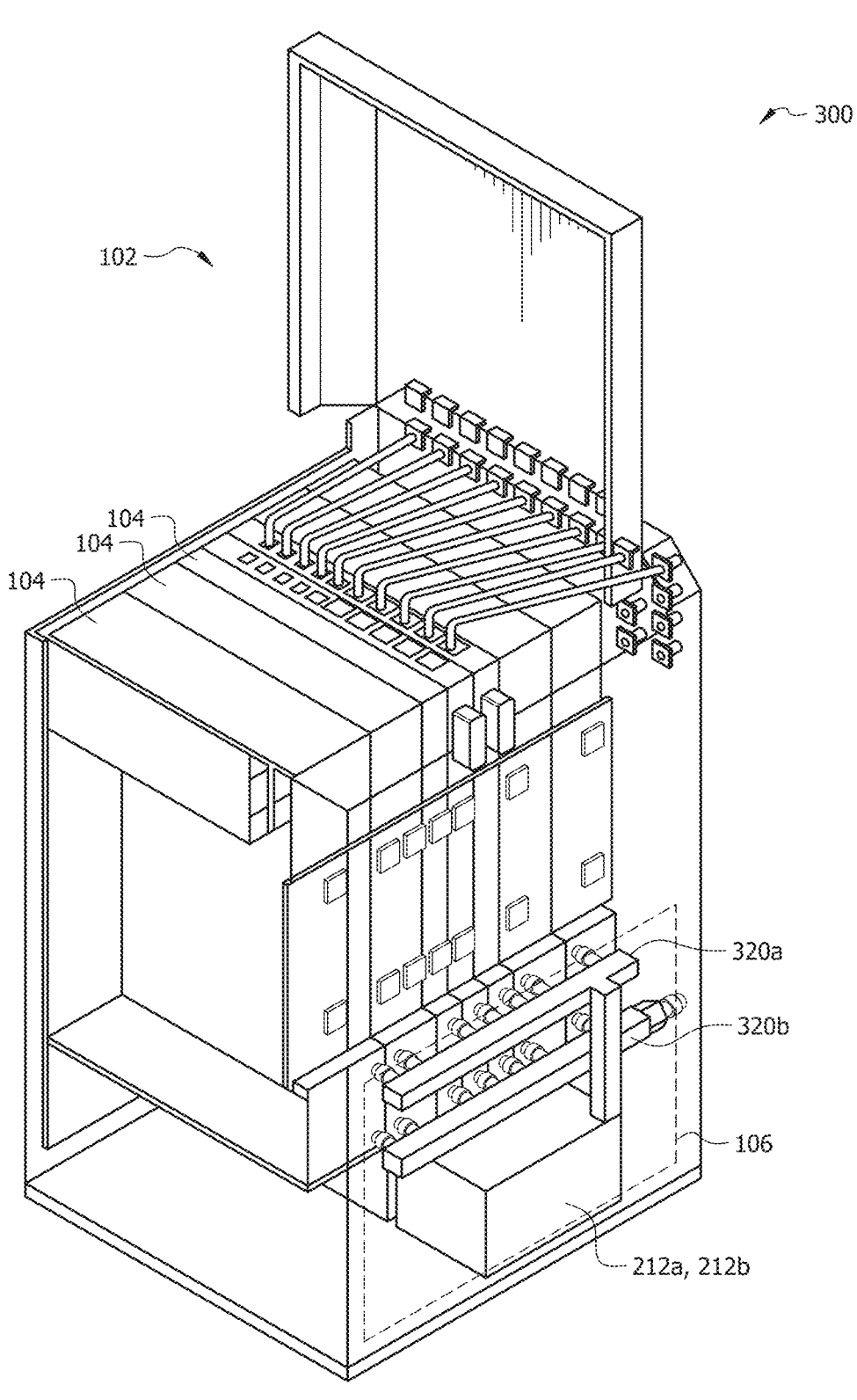
FIG. 3 illustrates an isometric view of an embodiment of an enclosure with the cooling system.

FIG. 3 illustrates an isometric view of an embodiment of the enclosure 102 with the cooling system 106, where a side plane is shown transparent to show the interior of the enclosure 102. As shown in FIG. 3, the cooling system 106 includes intake manifolds 320a that deliver the liquid coolant to the circuit boards 104 and exhaust manifolds 320b that collect liquid coolant from the circuit boards 104. The coolant flows from the pump 212a and 212b to the intake manifolds 320a connected to connectors at the edges of the circuit boards 104. The coolant flows thought the circuit boards 104 and absorbs the heat from the circuit boards 104. The warmed coolant is collected through the exhaust manifolds 320b. Each manifold 320 is sized to allow a particular flow rate of the coolant to a respective circuit board 104.

Example Configurations of Cooling Subsystems

Figure 4A:
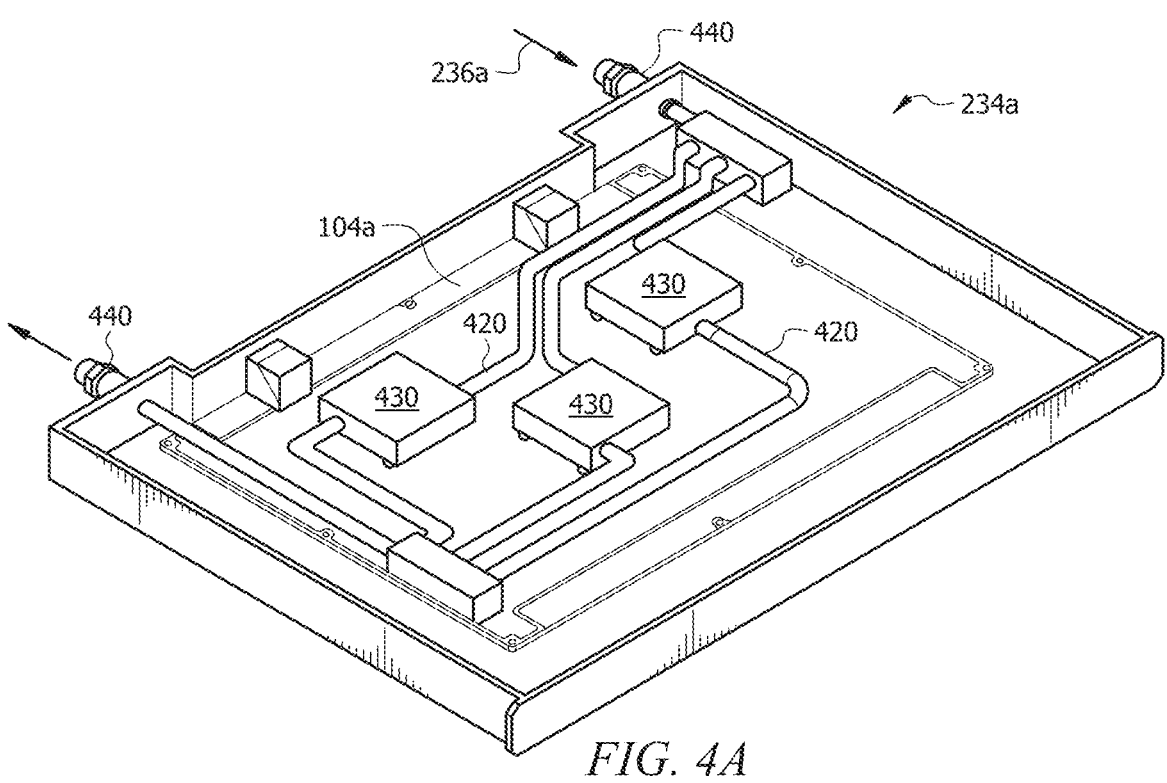
FIGS. 4A and 4B illustrate example embodiments of parallel cooling and series cooling with respect to the cooling system.
Figure 4B:
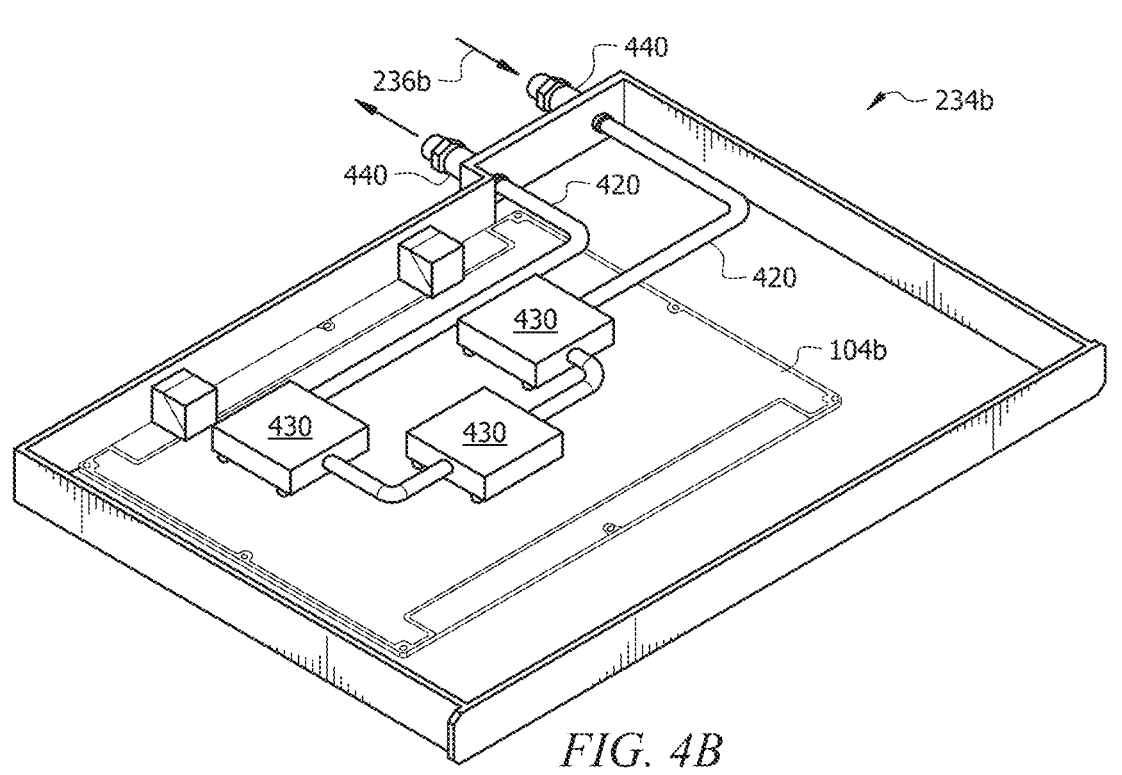

FIGS. 4A-4B illustrate example embodiments of circuit boards 104a and 104b with cooling subsystems 234a and 234b. As mentioned in the discussion of FIG. 2, the cooling subsystem 234a and 234b may include a set of liquid lines 420, heat sinks 430, and connectors 440. As shown in FIGS. 4A-4B, respectively, the set of liquid lines 420 may be positioned adjacent to the circuit board 104a and 104b and connected to the set of heat sinks 430. The set of liquid lines 420 may run through and among the electrical components on the circuit board 104a and 104b. Therefore, when the coolant runs through the liquid lines 420, the coolant picks up the heat from the electrical components and cools down the electrical components of the circuit board 104a and 104b. The liquid line 420 may have a particular dimension in terms of length, radius, etc. to allow the coolant to flow with the predefined flow rate 236a-b through the liquid lines 420, respectively.

Parallel Cooling Configuration

In the example of FIG. 4A, the liquid lines 420, heat sinks 430, and connectors 440 are designed and sized to facilitate the circulation of the coolant with the predefined flow rate 236a through the liquid lines 420. For example, the liquid lines 420 may be sized to allow the coolant to travel with the predefined flow rate 236a through the liquid lines 420. In another example, the heat sinks 430 may be mounted on the first circuit board 104a at particular locations where heat-generating electrical components are located on the circuit board 104a.

Each heat sink 430 may be implemented by a thermally conductive material, such as aluminum or copper, with a finned structure that increases the surface area available for heat dissipation. Each heat sink 430 may be thermally coupled to the electronic component generating heat to establish a thermal pathway for heat to transfer away from the component and into the surrounding area.

In the example of FIG. 4A, a parallel cooling configuration is shown. In this example, parallel liquid lines 420 are implemented so that the components on the circuit board 104a are cooled in parallel. In the parallel cooling configuration, the coolant's temperature does not drop as it flows through parallel liquid lines 420. Thus, the components are cooled with substantially same temperature coolant. In the parallel cooling configuration, the liquid lines 420 may be used to distribute the coolant among multiple liquid lines 420 and to collect the coolant from multiple liquid lines 420. In a parallel cooling configuration, each heat sink 430 is equipped with its dedicated set of liquid lines 420. The parallel cooling configuration is particularly beneficial for systems with multiple high-performance processors (e.g., processors on the circuit board 104a) or a mixture of different components, such as processors, memories, etc., as it provides consistent coolant temperature and flow rate to each component. While there is a potential for increased maintenance efforts in a parallel cooling system, proper installation and monitoring mitigate these concerns effectively. In some embodiments, parallel cooling may be a more suitable option over series cooling based on cooling requirements and constraints.

Series Cooling Configuration

In the example of FIG. 4B, the liquid lines 420, heat sinks 430, and connectors 440 are designed and sized to facilitate the circulation of the coolant with the predefined flow rate 236b through the liquid lines 420. For example, the liquid lines 420 may be sized to allow the coolant to travel with the predefined flow rate 236b through the liquid lines 420. In another example, the heat sinks 430 may be mounted adjacent to the first circuit board 104b at particular locations where heat-generating electrical components are located on the circuit board 104b.

In the example of FIG. 4B, a series cooling configuration is shown, where the liquid lines 420 are in series. Thus, the coolant flows through the liquid lines 420 one after another. In series cooling configuration, the coolant's temperature may increase as it flows through the one liquid line 420 to the next liquid line 420. Therefore, some components at the end of the liquid lines 420 may be exposed to a warmer coolant. To address this issue, the layout of the circuit board 104b and the cooling subsystem 234b may be designed so that heat-generating components are exposed to the coolant before other components along the liquid lines 420 and heat sinks 430. In a series cooling configuration, the coolant flows through a single set of liquid lines 420 that traverse through all the heat sinks 430 sequentially. This streamlined cooling setup simplifies the design, installation, and maintenance processes significantly. The reduced cooling complexity in a series cooling system translates to lower chances of leaks and easier troubleshooting in case of a leakage of the liquid coolant. With fewer components involved in the series cooling design, the potential points of failure are reduced. This improves the reliability and longevity of the system. Additionally, maintenance and repair become more straightforward and cost-effective due to the reduced number of cooling elements. The compact design of a series cooling system allows for more efficient utilization of space within the device or equipment housing. This can be advantageous, especially in constrained or tightly packed environments where minimizing the footprint of the cooling subsystem is essential and/or required. In some embodiments, series cooling may be a more suitable option over parallel cooling based on cooling requirements and constraints.

Example Method for Controlling Pumps

FIG. 5 illustrates an example flowchart of a method 500 for controlling pumps 212a and 212b, according to some embodiments of the present document. Modifications, additions, or omissions may be made to method 500. Method 500 may include more, fewer, or other operations. For example, operations may be performed in parallel or in any suitable order. While at times discussed as the autonomous vehicle 702, control device 750, controller 230, or components of any of thereof performing operations, any suitable system or components of the system may perform one or more operations of the method 500. For example, one or more operations of method 500 may be implemented, at least in part, in the form of software instructions 128, software instructions 248, and processing instructions 780, respectively, from FIGS. 1, 2, and 7, stored on non-transitory, tangible, machine-readable media (e.g., memory 126, memory 244, and data storage 790, respectively, from FIGS. 1, 2, and 7) that when run by one or more processors (e.g., processors 122, 240, and 770, respectively, from FIGS. 1, 2, and 7) may cause the one or more processors to perform 502-508.

At operation 502, the controller 230 receives a first flow rate data 250a associated with the liquid coolant from the first flow rate sensor 214a, where the first flow rate data 250a indicates the coolant flow rate 232a flowing out of the first pump 212a, similar to that described in FIG. 2.

At operation 504, the controller 230 receives a second flow rate data 250b associated with the liquid coolant from the second flow rate sensor 214b, where the second flow rate data 250b indicates the coolant flow rate 232b flowing out of the second pump 212b, similar to that described in FIG. 2.

At operation 506, the controller 230 determines whether the first flow rate 232a is less than the threshold flow rate 256a. If it is determined that the first flow rate 232a is less than the threshold flow rate 256a, method 500 proceeds to operation 506. Otherwise, the method 500 may return to operation 502.

At operation 508, the controller 230 communicates, to the second pump 212b, a signal 254b that indicates to increase the speed of the second pump 212b to compensate for the first flow rate 232a which is less than the threshold flow rate 256a. The method 500 may include similar operations for examining the second flow rate 232b. For example, if the controller 230 determines that the second flow rate 232b is less than the threshold flow rate 256b, the controller 230 may communicate, to the first pump 212a, a signal 254a that indicates to increase the speed of the first pump 212a to compensate for the second flow rate 232b that is less than the threshold flow rate 256b. In some embodiments, if both flow rates 232a and 232b are less than respective threshold flow rates 256a and 256b, the control device 750 may adjust the navigation of the autonomous vehicle 702. This operation is described in the method 600 of FIG. 6.

Example Method for Adjusting the Navigation of the Autonomous Vehicle in Response to Feedback from the Cooling System FIG. 6 illustrates an example flowchart of a method 600 for adjusting the navigation of the autonomous vehicle 702 in response to feedback from the cooling system 106, according to some embodiments of the present document. Modifications, additions, or omissions may be made to method 600. Method 600 may include more, fewer, or other operations. For example, operations may be performed in parallel or in any suitable order. While at times discussed as the autonomous vehicle 702, control device 750, controller 230, or components of any of thereof performing operations, any suitable system or components of the system may perform one or more operations of the method 600. For example, one or more operations of method 600 may be implemented, at least in part, in the form of software instructions 128, software instructions 248, and processing instructions 780, respectively, from FIGS. 1, 2, and 7, stored on non-transitory, tangible, machine-readable media (e.g., memory 126, memory 244, and data storage 790, respectively, from FIGS. 1, 2, and 7) that when run by one or more processors (e.g., processors 122, 240, and 770, respectively, from FIGS. 1, 2, and 7) may cause the one or more processors to perform 602-608.

At operation 602, the control device 750 receives one or more flow rate data 250a and 250b that indicate the respective flow rate 232a and 232b of coolant. For example, the control device 750 may receive the one or more flow rate data 250a and 250b from the flow rate sensors 212a and 212b via the controller 230. For example, the flow rate data 250a may indicate the flow rate 232a, and the flow rate data 250b may indicate the flow rate 232b of the coolant flowing out of the respective pumps 212a and 212b.

At operation 604, the control device 750 compares each flow rate 232a and 232b to the respective threshold flow rate 256a and 256b. For example, the control device 750 may compare the flow rate 232a to the threshold flow rate 256a, and compare the flow rate 232b to the threshold flow rate 256b. The control device 750 may determine or compute the total flow rate 232 by adding the flow rate 232a to the flow rate 232b.

At operation 606, the control device 750 determines whether the total flow rate 232 of the coolant is less than the minimum flow rate 258. If it is determined that the total flow rate 232 of the coolant is less than the minimum flow rate 258, method 600 proceeds to operation 608. Otherwise, the method 600 returns to operation 602.

At operation 608, the control device 750 causes the autonomous vehicle 702 to perform a minimal risk maneuver. Some examples of the minimal risk maneuver may include slowing down or reducing the traveling speed of the autonomous vehicle 702, stopping the autonomous vehicle 702, pulling over the autonomous vehicle 702 on a side of the road, taking a detour to another route that puts less stress on the internal components of the autonomous vehicle 702 and the cooling system 106, among other alterations to the navigation of the autonomous vehicle 702.

Example Autonomous Vehicle and its Operation

FIG. 7 shows a block diagram of an example vehicle ecosystem 700 in which autonomous driving operations can be determined. As shown in FIG. 7, the autonomous vehicle 702 may be a semi-trailer truck. The vehicle ecosystem 700 may include several systems and components that can generate and/or deliver one or more sources of information/data and related services to the in-vehicle control computer 750 that may be located in an autonomous vehicle 702. The in-vehicle control computer 750 can be in data communication with a plurality of vehicle subsystems 740, all of which can be resident in the autonomous vehicle 702. A vehicle subsystem interface 760 may be provided to facilitate data communication between the in-vehicle control computer 750 and the plurality of vehicle subsystems 740. In some embodiments, the vehicle subsystem interface 760 can include a controller area network (CAN) controller to communicate with devices in the vehicle subsystems 740.

The autonomous vehicle 702 may include various vehicle subsystems that support the operation of autonomous vehicle 702. The vehicle subsystems 740 may include a vehicle drive subsystem 742, a vehicle sensor subsystem 744, a vehicle control subsystem 748, network communication subsystem 792. The components or devices of the vehicle drive subsystem 742, the vehicle sensor subsystem 744, and the vehicle control subsystem 748 shown in FIG. 7 are examples. The autonomous vehicle 702 may be configured as shown or any other configurations.

The vehicle drive subsystem 742 may include components operable to provide powered motion for the autonomous vehicle 702. In an example embodiment, the vehicle drive subsystem 742 may include an engine/motor 742a, wheels/tires 742b, a transmission 742c, an electrical subsystem 742d, and a power source 742e.

The vehicle sensor subsystem 744 may include a number of sensors 746 configured to sense information about an environment or condition of the autonomous vehicle 702. The vehicle sensor subsystem 744 may include one or more cameras 746a or image capture devices, a radar unit 746b, one or more temperature sensors 746c, a wireless communication unit 746d (e.g., a cellular communication transceiver), an inertial measurement unit (IMU) 746e, a laser range finder/LiDAR unit 746f, a Global Positioning System (GPS) transceiver 746g, and/or a wiper control system 746h. The vehicle sensor subsystem 744 may also include sensors configured to monitor internal systems of the autonomous vehicle 702 (e.g., an 02 monitor, a fuel gauge, an engine oil temperature, etc.).

The IMU 746e may include any combination of sensors (e.g., accelerometers and gyroscopes) configured to sense position and orientation changes of the autonomous vehicle 702 based on inertial acceleration. The GPS transceiver 746g may be any sensor configured to estimate a geographic location of the autonomous vehicle 702. For this purpose, the GPS transceiver 746g may include a receiver/transmitter operable to provide information regarding the position of the autonomous vehicle 702 with respect to the Earth. The radar unit 746b may represent a system that utilizes radio signals to sense objects within the local environment of the autonomous vehicle 702. In some embodiments, in addition to sensing the objects, the radar unit 746b may additionally be configured to sense the speed and the heading of the objects proximate to the autonomous vehicle 702. The laser range finder or LiDAR unit 746f may be any sensor configured to use lasers to sense objects in the environment in which the autonomous vehicle 702 is located. The cameras 746a may include one or more devices configured to capture a plurality of images of the environment of the autonomous vehicle 702. The cameras 746a may be still image cameras or motion video cameras. The cameras 746a may include one or more devices configured to capture a plurality of infrared images of the environment of the autonomous vehicle 702. The cameras 746a may be still infrared image cameras or motion video infrared cameras.

Cameras 746a may be rear-facing and front-facing so that pedestrians, and any hand signals made by them or signs held by pedestrians, may be observed from all around the autonomous vehicle. These cameras 746a may include video cameras, cameras with filters for specific wavelengths, as well as any other cameras suitable to detect hand signals, hand-held traffic signs, or both hand signals and hand-held traffic signs. A sound detection array, such as a microphone or array of microphones, may be included in the vehicle sensor subsystem 644. The microphones of the sound detection array may be configured to receive audio indications of the presence of, or instructions from, authorities, including sirens and commands such as "Pull over". These microphones are mounted, or located, on the external portion of the vehicle, specifically on the outside of the tractor portion of an autonomous vehicle. Microphones used may be any suitable type, mounted such that they are effective both when the autonomous vehicle is at rest, as well as when it is moving at normal driving speeds.

The vehicle control subsystem 748 may be configured to control the operation of the autonomous vehicle 702 and its components. Accordingly, the vehicle control subsystem 748 may include various elements such as a throttle and gear selector 748a, a brakes unit 748b, a navigation unit 748c, a steering system 748d, and/or an autonomous control unit 748e. The throttle and gear selector 748a may be configured to control, for instance, the operating speed of the engine and, in turn, control the speed of the autonomous vehicle 702. The throttle and gear selector 748a may be configured to control the gear selection of the transmission. The brakes unit 748b can include any combination of mechanisms configured to decelerate the autonomous vehicle 702. The brakes unit 748b can slow the autonomous vehicle 702 in a standard manner, including by using friction to slow the wheels or engine braking. The brakes unit 748b may include an anti-lock brake system (ABS) that can prevent the brakes from locking up when the brakes are applied. The navigation unit 748c may be any system configured to determine a driving path or route for the autonomous vehicle 702. The navigation unit 748c may additionally be configured to update the driving path dynamically while the autonomous vehicle 702 is in operation. In some embodiments, the navigation unit 748c may be configured to incorporate data from the GPS transceiver 746g and one or more predetermined maps so as to determine the driving path for the autonomous vehicle 702. The steering system 748d may represent any combination of mechanisms that may be operable to adjust the heading of autonomous vehicle 702 in an autonomous mode or in a driver-controlled mode.

The autonomous control unit 748e may represent a control system configured to identify, evaluate, and avoid or otherwise negotiate potential obstacles or obstructions in the environment of the autonomous vehicle 702. In general, the autonomous control unit 748e may be configured to control the autonomous vehicle 702 for operation without a driver or to provide driver assistance in controlling the autonomous vehicle 702. In some embodiments, the autonomous control unit 748e may be configured to incorporate data from the GPS transceiver 746g, the radar unit 746b, the LiDAR unit 746f, the cameras 746a, and/or other vehicle subsystems to determine the driving path or trajectory for the autonomous vehicle 702.

The network communication subsystem 792 may comprise network interfaces, such as routers, switches, modems, and/or the like. The network communication subsystem 792 may be configured to establish communication between the autonomous vehicle 702 and other systems of FIG. 1. The network communication subsystem 792 may be further configured to send and receive data from and to other systems.

Many or all of the functions of the autonomous vehicle 702 can be controlled by the in-vehicle control computer 750. The in-vehicle control computer 750 may include at least one data processor 770 (which can include at least one microprocessor) that executes processing instructions 780 stored in a non-transitory computer-readable medium, such as the data storage device 790 or memory. The in-vehicle control computer 750 may also represent a plurality of computing devices that may serve to control individual components or subsystems of the autonomous vehicle 702 in a distributed fashion. In some embodiments, the data storage device 790 may contain processing instructions 780 (e.g., program logic) executable by the data processor 770 to perform various methods and/or functions of the autonomous vehicle 702, including those described with respect to FIGS. 1-9.

The data storage device 790 may contain additional instructions as well, including instructions to transmit data to, receive data from, interact with, or control one or more of the vehicle drive subsystem 742, the vehicle sensor subsystem 744, and the vehicle control subsystem 748. The in-vehicle control computer 750 can be configured to include a data processor 770 and a data storage device 790. The in-vehicle control computer 750 may control the function of the autonomous vehicle 702 based on inputs received from various vehicle subsystems (e.g., the vehicle drive subsystem 742, the vehicle sensor subsystem 744, and the vehicle control subsystem 748).

FIG. 8 shows an exemplary system 800 for providing precise autonomous driving operations. The system 800 may include several modules that can operate in the in-vehicle control computer 750, as described in FIG. 7. The in-vehicle control computer 750 may include a sensor fusion module 802 shown in the top left corner of FIG. 8, where the sensor fusion module 802 may perform at least four image or signal processing operations. The sensor fusion module 802 can obtain images from cameras located on an autonomous vehicle to perform image segmentation 804 to detect the presence of moving objects (e.g., other vehicles, pedestrians, etc.) and/or static obstacles (e.g., stop sign, speed bump, terrain, etc.) located around the autonomous vehicle. The sensor fusion module 802 can obtain LiDAR point cloud data item from LiDAR sensors located on the autonomous vehicle to perform LiDAR segmentation 806 to detect the presence of objects and/or obstacles located around the autonomous vehicle.

The sensor fusion module 802 can perform instance segmentation 808 on image and/or point cloud data items to identify an outline (e.g., boxes) around the objects and/or obstacles located around the autonomous vehicle. The sensor fusion module 802 can perform temporal fusion 810 where objects and/or obstacles from one image and/or one frame of point cloud data item are correlated with or associated with objects and/or obstacles from one or more images or frames subsequently received in time.

The sensor fusion module 802 can fuse the objects and/or obstacles from the images obtained from the camera and/or point cloud data item obtained from the LiDAR sensors. For example, the sensor fusion module 802 may determine based on a location of two cameras that an image from one of the cameras comprising one half of a vehicle located in front of the autonomous vehicle is the same as the vehicle captured by another camera. The sensor fusion module 802 may send the fused object information to the tracking or prediction module 846 and the fused obstacle information to the occupancy grid module 860. The in-vehicle control computer may include the occupancy grid module 860 which can retrieve landmarks from a map database 858 stored in the in-vehicle control computer. The occupancy grid module 860 can determine drivable areas and/or obstacles from the fused obstacles obtained from the sensor fusion module 802 and the landmarks stored in the map database 858. For example, the occupancy grid module 860 can determine that a drivable area may include a speed bump obstacle.

As shown in FIG. 7, the in-vehicle control computer 750 (see FIG. 7) may include a LiDAR-based object detection module 812 that can perform object detection 816 based on a point cloud data item obtained from the LiDAR sensors 814 located on the autonomous vehicle. The object detection 816 technique can provide a location (e.g., in 3D world coordinates) of objects from the point cloud data item. The in-vehicle control computer may include an image-based object detection module 818 that can perform deep image-based object detection 824 based on images obtained from cameras 820 located on the autonomous vehicle. The image-based object detection module 818 can employ a deep image-based object detection module 824 to provide a location (e.g., in 3D world coordinates) of objects from the image provided by the camera 820.

The radar 856 on the autonomous vehicle can scan an area surrounding the autonomous vehicle or an area towards which the autonomous vehicle is driven. The radar data may be sent to the sensor fusion module 802 that can use the radar data to correlate the objects and/or obstacles detected by the radar 856 with the objects and/or obstacles detected from both the LiDAR point cloud data item and the camera image. The radar data also may be sent to the tracking or prediction module 846 that can perform data processing on the radar data to track objects by object tracking module 848 as further described below.

The in-vehicle control computer may include a tracking or prediction module 846 that receives the locations of the objects from the point cloud and the objects from the image, and the fused objects from the sensor fusion module 802. The tracking or prediction module 846 also receives the radar data with which the tracking or prediction module 846 can track objects by object tracking module 848 from one point cloud data item and one image obtained at one time instance to another (or the next) point cloud data item and another image obtained at another subsequent time instance.

The tracking or prediction module 846 may perform object attribute estimation 850 to estimate one or more attributes of an object detected in an image or point cloud data item. The one or more attributes of the object may include a type of object (e.g., pedestrian, car, or truck, etc.). The tracking or prediction module 846 may perform behavior prediction 852 to estimate or predict motion pattern of an object detected in an image and/or a point cloud. The behavior prediction 852 can be performed to detect a location of an object in a set of images received at different points in time (e.g., sequential images) or in a set of point cloud data item received at different points in time (e.g., sequential point cloud data items). In some embodiments, the behavior prediction 852 can be performed for each image received from a camera and/or each point cloud data item received from the LiDAR sensor. In some embodiments, the tracking or prediction module 846 can be performed (e.g., run or executed) on received data to reduce computational load by performing behavior prediction 852 on every other or after every pre-determined number of images received from a camera or point cloud data item received from the LiDAR sensor (e.g., after every two images or after every three-point cloud data items).

The behavior prediction 852 feature may determine the speed and direction of the objects that surround the autonomous vehicle from the radar data, where the speed and direction information can be used to predict or determine motion patterns of objects. A motion pattern may comprise a predicted trajectory information of an object over a pre-determined length of time in the future after an image is received from a camera. Based on the motion pattern predicted, the tracking or prediction module 846 may assign motion pattern situational tags to the objects (e.g., "located at coordinates (x,y)," "stopped," "driving at 50 mph," "speeding up" or "slowing down"). The situation tags can describe the motion pattern of the object. The tracking or prediction module 846 may send the one or more object attributes (e.g., types of the objects) and motion pattern situational tags to the planning module 862. The tracking or prediction module 846 may perform an environment analysis 854 using any information acquired by system 800 and any number and combination of its components.

The in-vehicle control computer may include the planning module 862 that receives the object attributes and motion pattern situational tags from the tracking or prediction module 846, the drivable area and/or obstacles, and the vehicle location and pose information from the fused localization module 826 (further described below).

The planning module 862 can perform navigation planning 864 to determine a set of trajectories on which the autonomous vehicle can be driven. The set of trajectories can be determined based on the drivable area information, the one or more object attributes of objects, the motion pattern situational tags of the objects, location of the obstacles, and the drivable area information. In some embodiments, the navigation planning 864 may include determining an area next to the road where the autonomous vehicle can be safely parked in case of emergencies. The planning module 862 may include behavioral decision making 866 to determine driving actions (e.g., steering, braking, throttle) in response to determining changing conditions on the road (e.g., traffic light turned yellow, or the autonomous vehicle is in an unsafe driving condition because another vehicle drove in front of the autonomous vehicle and in a region within a pre-determined safe distance of the location of the autonomous vehicle). The planning module 862 performs trajectory generation 868 and selects a trajectory from the set of trajectories determined by the navigation planning 864 operation. The selected trajectory information may be sent by the planning module 862 to the control module 870.

The in-vehicle control computer may include a control module 870 that receives the proposed trajectory from the planning module 862 and the autonomous vehicle location and pose from the fused localization module 826. The control module 870 may include a system identifier 872. The control module 870 can perform a model-based trajectory refinement 874 to refine the proposed trajectory. For example, the control module 870 can apply filtering (e.g., Kalman filter) to make the proposed trajectory data smooth and/or to minimize noise. The control module 870 may perform the robust control 876 by determining, based on the refined proposed trajectory information and current location and/or pose of the autonomous vehicle, an amount of brake pressure to apply, a steering angle, a throttle amount to control the speed of the vehicle, and/or a transmission gear. The control module 870 can send the determined brake pressure, steering angle, throttle amount, and/or transmission gear to one or more devices in the autonomous vehicle to control and facilitate precise driving operations of the autonomous vehicle.

The deep image-based object detection module 824 performed by the image-based object detection module 818 can also be used detect landmarks (e.g., stop signs, speed bumps, etc.) on the road. The in-vehicle control computer may include a fused localization module 826 that obtains landmarks detected from images, the landmarks obtained from a map database 836 stored on the in-vehicle control computer, the landmarks detected from the point cloud data item by the LiDAR-based object detection module 812, the speed and displacement from the odometer sensor 844 and the esti-mated location of the autonomous vehicle from the GPS/IMU sensor 838 (i.e., GPS sensor 840 and IMU sensor 842) located on or in the autonomous vehicle. Based on this information, the fused localization module 826 can perform a localization operation 828 to determine a location of the autonomous vehicle, which can be sent to the planning module 862 and the control module 870.

The fused localization module 826 can estimate pose 830 of the autonomous vehicle based on the GPS and/or IMU sensors 838. The pose of the autonomous vehicle can be sent to the planning module 862 and the control module 870. The fused localization module 826 can also estimate status (e.g., location, possible angle of movement) of the trailer unit based on (e.g., trailer status estimation 834), for example, the information provided by the IMU sensor 842 (e.g., angular rate and/or linear velocity). The fused localization module 826 may also check the content of the map 836 by the map content checker 832.

FIG. 9 shows an exemplary block diagram of an in-vehicle control computer 750 included in an autonomous vehicle 702. The in-vehicle control computer 750 may include at least one processor 904 and a memory 902 having instructions stored thereupon (e.g., software instructions 128 and processing instructions 780 in FIGS. 1 and 7, respectively). The instructions, upon execution by the processor 904, configure the in-vehicle control computer 750 and/or the various modules of the in-vehicle control computer 750 to perform the operations described in FIGS. 1-9. The transmitter 906 may transmit or send information or data to one or more devices in the autonomous vehicle. For example, the transmitter 906 can send an instruction to one or more motors of the steering wheel to steer the autono-mous vehicle. The receiver 908 receives information or data transmitted or sent by one or more devices. For example, the receiver 908 receives a status of the current speed from the odometer sensor or the current transmission gear from the transmission. The transmitter 906 and receiver 908 also may be configured to communicate with the plurality of vehicle subsystems 740 and the in-vehicle control computer 750 described above in FIGS. 7 and 8.

While several embodiments have been provided in this document, it should be understood that the disclosed sys-tems and methods might be embodied in many other specific forms without departing from the spirit or scope of this document. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and meth-ods described and illustrated in the various embodiments as discrete or separate may be combined or integrated with other systems, modules, techniques, or methods without departing from the scope of this document. Other items shown or discussed as coupled or directly coupled or com-municating with each other may be indirectly coupled or communicating through some interface, device, or interme-diate component whether electrically, mechanically, or oth-erwise. Other examples of changes, substitutions, and altera-tions are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

Implementations of some preferred embodiments can be described in view of the following clauses, the features of which can be combined in any reasonable manner.

Clause 1. A cooling system for an autonomous vehicle, comprising:

a set of pumps comprising a first pump and a second pump;

a set of flow rate sensor circuits comprising:

a first flow rate sensor circuit configured to detect a liquid coolant flow rate on an outlet of the first pump; and a second flow rate sensor circuit configured to detect the liquid coolant flow rate on an outlet of the second pump;

a cooling subsystem configured to provide a liquid cool-ant to an intake manifold through which the liquid coolant flows towards one or more circuit boards; and a processor communicatively coupled with the set of flow rate sensor circuits and the set of pumps, the processor configured to:

receive a first flow rate data from the first flow rate sensor circuit, wherein the first flow rate data indi-cates a first flow rate of the liquid coolant flowing out from the first pump;

receive a second flow rate data from the second flow rate sensor circuit, wherein the second flow rate data indicates a second flow rate of the liquid coolant flowing out of the second pump;

detect that the first flow rate of the liquid coolant is less than a threshold flow rate; and in response to determining that the first flow rate of the liquid coolant is less than the threshold flow rate, communicate, to the second pump, a signal that indicates to increase a speed of the second pump to increase the second flow rate of the liquid coolant flowing out of the second pump and compensate for the first flow rate that is less than the threshold flow rate.

Clause 2. The cooling system of Clause 1, wherein:

the cooling subsystem is further configured to provide cooling to a first circuit board according to a first cooling requirement of the first circuit board, wherein the cooling is provided to the first circuit board by the liquid coolant through a first liquid tube, wherein the cooling subsystem is connected to the set of pumps;

the cooling subsystem further comprises a second cooling subsystem configured to provide cooling to a second circuit board according to a second cooling requirement of the second circuit board;

the cooling is provided to the second circuit board by the liquid coolant through a second liquid tube;

the second cooling subsystem is connected to the set of pumps; and the first cooling requirement is different from the second cooling requirement.

Clause 3. The cooling system of Clause 2, wherein the processor is further configured to operate at least one of the set of pumps to direct the liquid coolant from the at least one of the set of pumps toward the first circuit board and the second circuit board to satisfy the first cooling requirement of the first circuit board and the second cooling requirement of the second circuit board.

Clause 4. The cooling system of Clause 2, wherein the processor is further configured to:

determine a circulation frequency of the liquid coolant to satisfy the first cooling requirement of the first circuit board and the second cooling requirement of the second circuit board;

determine a first speed for the first pump and a second speed for the second pump, wherein the first speed and the second speed are associated with the determined circulation frequency of the liquid coolant;

communicate a first signal that indicates the first speed for the first pump to the first pump; and communicate a second signal that indicates the second speed for the second pump to the second pump.

Clause 5. The cooling system of Clause 2, further comprising an accumulator downstream of the set of pumps, the accumulator configured to stabilize a flow rate of the liquid coolant traveling through the cooling subsystem and the second cooling subsystem.

Clause 6. The cooling system of Clause 5, wherein the accumulator comprises:

a tank that is configured to store the liquid coolant; and an output port configured to restrict the flow rate of the liquid coolant to a steady state flow rate.

Clause 7. The cooling system of Clause 2, wherein:

the first cooling requirement indicates to maintain a temperature less than a first threshold temperature at the first circuit board; and the second cooling requirement indicates to maintain a temperature less than a second threshold temperature at the second circuit board.

Clause 8. A method comprising:

receiving a first flow rate data from a first flow rate sensor circuit, wherein:

the first flow rate sensor circuit configured to detect a liquid coolant flow rate on an outlet of a first pump; and the first flow rate data indicates a first flow rate of a liquid coolant flowing out from the first pump;

receiving a second flow rate data from a second flow rate sensor circuit, wherein:

the second flow rate sensor circuit configured to detect the liquid coolant flow rate on an outlet of a second pump; and the second flow rate data indicates a second flow rate of the liquid coolant flowing out of the second pump;

detecting that the first flow rate of the liquid coolant is less than a threshold flow rate; and in response to determining that the first flow rate of the liquid coolant is less than the threshold flow rate, communicating, to the second pump, a signal that indicates to increase a speed of the second pump to increase the second flow rate of the liquid coolant flowing out of the second pump and compensate for the first flow rate that is less than the threshold flow rate.

Clause 9. The method of Clause 8, further comprising providing the liquid coolant to an intake manifold through which the liquid coolant flows towards a set of circuit boards, wherein the set of circuit boards comprises a first circuit board, wherein:

providing the liquid coolant to the intake manifold through which the liquid coolant flows towards the set of circuit boards comprises providing cooling to the first circuit board according to a first cooling requirement of the first circuit board;

the first circuit board is configured to perform a first operation that requires a first amount of computing resources; and the first cooling requirement is defined so that the first operation is performed with at least a first threshold performance level.

Clause 10. The method of Clause 9, wherein:

the set of circuit boards further comprises a second circuit board;

providing the liquid coolant to the intake manifold through which the liquid coolant flows towards the set of circuit boards comprises providing cooling to the second circuit board according to a second cooling requirement of the second circuit board;

the second circuit board is configured to perform a second operation that requires a second amount of computing resources; and the second cooling requirement is defined so that the second operation is performed with at least a second threshold performance level.

Clause 11. The method of Clause 9, wherein:

providing cooling to the first circuit board is performed by a cooling subsystem that is configured with first physical attributes; and the cooling subsystem comprises:

a first set of manifolds sized to allow a first flow rate of the liquid coolant through a first set of liquid lines;

the first set of liquid lines positioned adjacent the first circuit board, and connected to a first set of heat sinks; and the first set of heat sinks mounted on top of the first circuit board.

Clause 12. The method of Clause 11, wherein the first physical attributes comprise at least one of a size of each of the first set of manifolds, a length of each of the first set of liquid lines, a radius of each of the first set of liquid lines, or a size of each of the first set of heat sinks.

Clause 13. The method of Clause 10, wherein:

providing cooling to the second circuit board is performed by a second cooling subsystem that is configured with second physical attributes; and the second cooling subsystem comprises:

a second set of manifolds sized to allow a second flow rate of the liquid coolant through a second set of liquid lines;

the second set of liquid lines positioned adjacent the second circuit board, and connected to a second set of heat sinks; and the second set of heat sinks mounted on top of the second circuit board.

Clause 14. The method of Clause 13, wherein the second physical attributes comprise at least one of a size of each of the second set of manifolds, a length of each of the second set of liquid lines, a radius of each of the second set of liquid lines, and a size of each of the second set of heat sinks.

Clause 15. A non-transitory computer-readable medium storing instructions that when executed by a processor cause the processor to:

receive a first flow rate data from a first flow rate sensor circuit, wherein:

the first flow rate sensor circuit configured to detect a liquid coolant flow rate on an outlet of a first pump; and the first flow rate data indicates a first flow rate of a liquid coolant flowing out from the first pump;

receive a second flow rate data from a second flow rate sensor circuit, wherein:

the second flow rate sensor circuit configured to detect the liquid coolant flow rate on an outlet of a second pump; and the second flow rate data indicates a second flow rate of the liquid coolant flowing out of the second pump;

detect that the first flow rate of the liquid coolant is less than a threshold flow rate; and in response to determining that the first flow rate of the liquid coolant is less than the threshold flow rate, communicate, to the second pump, a signal that indicates to increase a speed of the second pump to increase the second flow rate of the liquid coolant flowing out of the second pump and compensate for the first flow rate that is less than the threshold flow rate.

Clause 16. The non-transitory computer-readable medium of Clause 15, wherein each of the first pump and the second pump is configured to operate at a half duty cycle.

Clause 17. The non-transitory computer-readable medium of Clause 15, wherein:

the first pump operates at a full duty cycle; and the second pump operates at zero duty cycle.

Clause 18. The non-transitory computer-readable medium of Clause 16, wherein:

the first flow rate sensor circuit is positioned adjacent to the first pump; and the second flow rate sensor circuit is positioned adjacent to the second pump.

Clause 19. The non-transitory computer-readable medium of Clause 15, wherein the instructions further cause the processor to:

detect a temperature of the liquid coolant flown through an exhaust manifold from at least one of a set of circuit boards, wherein the first pump and the second pump are configured to provide the liquid coolant to the set of circuit boards;

determine that the detected temperature of the liquid coolant is more than a threshold temperature; and in response to determining that the detected temperature of the liquid coolant is more than the threshold temperature, communicate, to the second pump, a second signal to increase the speed of the second pump to increase a combined flow rate of the liquid coolant that comprises the first flow rate and the second flow rate of the liquid coolant.

Clause 20. The non-transitory computer-readable medium of Clause 19, further comprising a radiator downstream of the set of circuit boards.

Clause 21. A cooling system for an autonomous vehicle, comprising:

a set of pumps comprising a first pump and a second pump;

a set of flow rate sensor circuits comprising:

a first flow rate sensor circuit configured to detect a liquid coolant flow rate on an outlet of the first pump; and a second flow rate sensor circuit configured to detect the liquid coolant flow rate on an outlet of the second pump;

a cooling subsystem configured to provide a liquid coolant to an intake manifold through which the liquid coolant flows towards one or more circuit boards; and a processor communicatively coupled with the set of flow rate sensor circuits and the set of pumps, the processor configured to:

receive a first flow rate data from the first flow rate sensor circuit, wherein the first flow rate data indicates a first flow rate of the liquid coolant flowing out from the first pump;

receive a second flow rate data from the second flow rate sensor circuit, wherein the second flow rate data indicates a second flow rate of the liquid coolant flowing out of the second pump;

detect that the first flow rate of the liquid coolant is less than a threshold flow rate; and in response to determining that the first flow rate of the liquid coolant is less than the threshold flow rate, communicate, to the second pump, a signal that indicates to increase a speed of the second pump to increase the second flow rate of the liquid coolant flowing out of the second pump and compensate for the first flow rate that is less than the threshold flow rate.

Clause 22. The cooling system of Clause 21, wherein:

the cooling subsystem is further configured to provide cooling to a first circuit board according to a first cooling requirement of the first circuit board, wherein the cooling is provided to the first circuit board by the liquid coolant through a first liquid tube, wherein the cooling subsystem is connected to the set of pumps;

the cooling subsystem further comprises a second cooling subsystem configured to provide cooling to a second circuit board according to a second cooling requirement of the second circuit board;

the cooling is provided to the second circuit board by the liquid coolant through a second liquid tube;

the second cooling subsystem is connected to the set of pumps; and the first cooling requirement is different from the second cooling requirement.

Clause 23. The cooling system of Clause 22, wherein the processor is further configured to operate at least one of the set of pumps to direct the liquid coolant from the at least one of the set of pumps toward the first circuit board and the second circuit board to satisfy the first cooling requirement of the first circuit board and the second cooling requirement of the second circuit board.

Clause 24. The cooling system of Clause 22, wherein the processor is further configured to:

determine a circulation frequency of the liquid coolant to satisfy the first cooling requirement of the first circuit board and the second cooling requirement of the second circuit board;

determine a first speed for the first pump and a second speed for the second pump, wherein the first speed and the second speed are associated with the determined circulation frequency of the liquid coolant;

communicate a first signal that indicates the first speed for the first pump to the first pump; and communicate a second signal that indicates the second speed for the second pump to the second pump.

Clause 25. The cooling system of Clause 22, further comprising an accumulator downstream of the set of pumps, the accumulator configured to stabilize a flow rate of the liquid coolant traveling through the cooling subsystem and the second cooling subsystem.

Clause 26. The cooling system of Clause 25, wherein the accumulator comprises:

a tank that is configured to store the liquid coolant; and an output port configured to restrict the flow rate of the liquid coolant to a steady state flow rate.

Clause 27. The cooling system of Clause 22, wherein:

the first cooling requirement indicates to maintain a temperature less than a first threshold temperature at the first circuit board; and the second cooling requirement indicates to maintain a temperature less than a second threshold temperature at the second circuit board.

Clause 28. A method comprising:

receiving a first flow rate data from a first flow rate sensor circuit, wherein:

the first flow rate sensor circuit configured to detect a liquid coolant flow rate on an outlet of a first pump; and the first flow rate data indicates a first flow rate of a liquid coolant flowing out from the first pump;

receiving a second flow rate data from a second flow rate sensor circuit, wherein:

the second flow rate sensor circuit configured to detect the liquid coolant flow rate on an outlet of a second pump; and the second flow rate data indicates a second flow rate of the liquid coolant flowing out of the second pump;

detecting that the first flow rate of the liquid coolant is less than a threshold flow rate; and in response to determining that the first flow rate of the liquid coolant is less than the threshold flow rate, communicating, to the second pump, a signal that indicates to increase a speed of the second pump to increase the second flow rate of the liquid coolant flowing out of the second pump and compensate for the first flow rate that is less than the threshold flow rate.

Clause 29. The method of Clause 28, further comprising providing the liquid coolant to an intake manifold through which the liquid coolant flows towards a set of circuit boards, wherein the set of circuit boards comprises a first circuit board, wherein:

providing the liquid coolant to the intake manifold through which the liquid coolant flows towards the set of circuit boards comprises providing cooling to the first circuit board according to a first cooling requirement of the first circuit board;

the first circuit board is configured to perform a first operation that requires a first amount of computing resources; and the first cooling requirement is defined so that the first operation is performed with at least a first threshold performance level.

Clause 30. The method of Clause 29, wherein:

the set of circuit boards further comprises a second circuit board;

providing the liquid coolant to the intake manifold through which the liquid coolant flows towards the set of circuit boards comprises providing cooling to the second circuit board according to a second cooling requirement of the second circuit board;

the second circuit board is configured to perform a second operation that requires a second amount of computing resources; and the second cooling requirement is defined so that the second operation is performed with at least a second threshold performance level.

Clause 31. The method of Clause 29, wherein:

providing cooling to the first circuit board is performed by a cooling subsystem that is configured with first physical attributes; and the cooling subsystem comprises:

a first set of manifolds sized to allow a first flow rate of the liquid coolant through a first set of liquid lines;

the first set of liquid lines positioned adjacent the first circuit board, and connected to a first set of heat sinks; and the first set of heat sinks mounted on top of the first circuit board.

Clause 32. The method of Clause 31, wherein the first physical attributes comprise at least one of a size of each of the first set of manifolds, a length of each of the first set of liquid lines, a radius of each of the first set of liquid lines, or a size of each of the first set of heat sinks.

Clause 33. The method of Clause 30, wherein:

providing cooling to the second circuit board is performed by a second cooling subsystem that is configured with second physical attributes; and the second cooling subsystem comprises:

a second set of manifolds sized to allow a second flow rate of the liquid coolant through a second set of liquid lines;

the second set of liquid lines positioned adjacent the second circuit board, and connected to a second set of heat sinks; and the second set of heat sinks mounted on top of the second circuit board.

Clause 34. The method of Clause 33, wherein the second physical attributes comprise at least one of a size of each of the second set of manifolds, a length of each of the second set of liquid lines, a radius of each of the second set of liquid lines, and a size of each of the second set of heat sinks.

Clause 35. A non-transitory computer-readable medium storing instructions that when executed by a processor cause the processor to:

receive a first flow rate data from a first flow rate sensor circuit, wherein:

the first flow rate sensor circuit configured to detect a liquid coolant flow rate on an outlet of a first pump; and the first flow rate data indicates a first flow rate of a liquid coolant flowing out from the first pump;

receive a second flow rate data from a second flow rate sensor circuit, wherein:

the second flow rate sensor circuit configured to detect the liquid coolant flow rate on an outlet of a second pump; and the second flow rate data indicates a second flow rate of the liquid coolant flowing out of the second pump;

detect that the first flow rate of the liquid coolant is less than a threshold flow rate; and in response to determining that the first flow rate of the liquid coolant is less than the threshold flow rate, communicate, to the second pump, a signal that indicates to increase a speed of the second pump to increase the second flow rate of the liquid coolant flowing out of the second pump and compensate for the first flow rate that is less than the threshold flow rate.

Clause 36. The non-transitory computer-readable medium of Clause 35, wherein each of the first pump and the second pump is configured to operate at a half duty cycle.

Clause 37. The non-transitory computer-readable medium of Clause 35, wherein:

the first pump operates at a full duty cycle; and the second pump operates at zero duty cycle.

Clause 38. The non-transitory computer-readable medium of Clause 16, wherein:

the first flow rate sensor circuit is positioned adjacent to the first pump; and the second flow rate sensor circuit is positioned adjacent to the second pump.

Clause 39. The non-transitory computer-readable medium of Clause 35, wherein the instructions further cause the processor to:

detect a temperature of the liquid coolant flown through an exhaust manifold from at least one of a set of circuit boards, wherein the first pump and the second pump are configured to provide the liquid coolant to the set of circuit boards;

determine that the detected temperature of the liquid coolant is more than a threshold temperature; and in response to determining that the detected temperature of the liquid coolant is more than the threshold temperature, communicate, to the second pump, a second signal to increase the speed of the second pump to increase a combined flow rate of the liquid coolant that comprises the first flow rate and the second flow rate of the liquid coolant.

Clause 40. The non-transitory computer-readable medium of Clause 39, further comprising a radiator downstream of the set of circuit boards.

Clause 41. The system of any of Clauses 1-7, wherein the processor is further configured to perform one or more operations according to any of Clauses 8-14.

Clause 42. The system of any of Clauses 1-7, wherein the processor is configured to perform one or more operations according to any of Clauses 16-20.

Clause 43. The method of any of Clauses 8-14, further comprising one or more operations according to any of Clauses 1-7.

Clause 44. The method of any of Clauses 8-14, further comprising one or more operations according to any of Clauses 16-20.

Clause 45. An apparatus comprising means for performing one or more operations according to any of Clauses 1-20.

Clause 46. A method comprising operations according to any of Clauses 1-20.

Clause 47. A non-transitory computer-readable medium storing instructions that when executed by one or more processors, cause the one or more processors to perform operations according to any of Clauses 1-20.

Clause 48. The system of any of Clauses 21-27, wherein the processor is further configured to perform one or more operations according to any of Clauses 28-34.

Clause 49. The system of any of Clauses 21-27, wherein the processor is configured to perform one or more operations according to any of Clauses 36-40.

Clause 50. The method of any of Clauses 28-34, further comprising one or more operations according to any of Clauses 21-27.

Clause 51. The method of any of Clauses 28-34, further comprising one or more operations according to any of Clauses 36-40.

Clause 52. An apparatus comprising means for performing one or more operations according to any of Clauses 21-40.

Clause 53. A method comprising operations according to any of Clauses 21-40.

Clause 54. A non-transitory computer-readable medium storing instructions that when executed by one or more processors, cause the one or more processors to perform operations according to any of Clauses 21-40.

The invention claimed is:

1. A system comprising:

an autonomous vehicle configured to travel on a road autonomously; and a cooling system associated with the autonomous vehicle, the cooling system comprises:

one or more pumps configured to direct a flow of a coolant towards a set of circuit boards; and one or more flow rate sensor circuits configured to detect a flow rate of the coolant traveling from the one or more pumps towards the set of circuit boards; and a processor associated with the autonomous vehicle, and configured to:

receive, from the one or more flow rate sensor circuits, one or more signals that indicate the flow rate of the coolant provided to the set of circuit boards;

compare the flow rate of the coolant to a threshold flow rate;

determine that a total flow rate of the coolant is less than the threshold flow rate; and in response to determining that the flow rate of the coolant is less than the threshold flow rate, cause the autonomous vehicle to perform a minimal risk maneuver.

2. The system of claim 1, wherein the processor further configured to communicate a signal that indicates the one or more pumps need to be serviced to a server at a destination terminal.

3. The system of claim 1, wherein the minimal risk maneuver comprises reducing a traveling speed of the autonomous vehicle.

4. The system of claim 1, wherein:

the one or more pumps comprise a first pump and a second pump;

the one or more flow rate sensor circuits comprise a first flow rate sensor circuit and a second flow rate sensor circuit;

the first flow rate sensor circuit is positioned adjacent to the first pump; and the second flow rate sensor circuit is positioned adjacent to the second pump.

5. The system of claim 1, wherein receiving, from the one or more flow rate sensor circuits, one or more signals that indicate the flow rate of the coolant provided to the set of circuit boards comprises:

receiving a first signal that indicates a first flow rate of a first coolant on an outlet of a first pump from a first flow rate sensor circuit; and receiving a second signal that indicates a second flow rate of a second coolant on an outlet of a second pump from a second flow rate sensor circuit.

6. The system of claim 5, wherein the processor is further configured to:

determine that the first flow rate of the first coolant is less than a first threshold flow rate; and in response to determining that the first flow rate of the first coolant is less than the first threshold flow rate, communicate, to the second pump, a third signal that indicates to increase a speed of the second pump to compensate for the first flow rate that is less than the first threshold flow rate.

7. The system of claim 5, wherein the total flow rate is determined by adding the first flow rate to the second flow rate.

8. A method comprising:

receiving, from one or more flow rate sensor circuits, one or more signals that indicate a flow rate of a coolant provided to a set of circuit boards, wherein:

the one or more flow rate sensor circuits are configured
to detect the flow rate of the coolant traveling from
one or more pumps towards the set of circuit boards;
and the one or more pumps are configured to direct a flow
of the coolant towards the set of circuit boards;

comparing the flow rate of the coolant to a threshold flow
rate;

determining that a total flow rate of the coolant is less than
the threshold flow rate; and in response to determining that the flow rate of the coolant
is less than the threshold flow rate, causing an autono-
mous vehicle to perform a minimal risk maneuver.

9. The method of claim 8, wherein:

the one or more pumps comprise a first pump and a
second pump;

the first pump operates at a full duty cycle; and the second pump operates at zero duty cycle.

10. The method of claim 8, wherein each of the one or
more pumps is configured to operate at a half duty cycle.

11. The method of claim 8, wherein the coolant is a liquid
coolant.

12. The method of claim 8, the method is performed by a
cooling system that is placed within an enclosure between a
driver seat and a passenger seat of the autonomous vehicle.

13. The method of claim 8, wherein the autonomous
vehicle comprises one or more sensor circuits.

14. The method of claim 13, wherein the one or more
sensor circuits comprise a camera sensor circuit, a light
detection and ranging (LiDAR) sensor circuit, or an infrared
sensor circuit.

15. A non-transitory computer-readable medium storing
instructions that when executed by a processor cause the
processor to:

receive, from one or more flow rate sensor circuits, one or
more signals that indicate a flow rate of a coolant
provided to a set of circuit boards, wherein:

the one or more flow rate sensor circuits are configured
to detect the flow rate of the coolant traveling from
one or more pumps towards the set of circuit boards;
and the one or more pumps are configured to direct a flow
of the coolant towards the set of circuit boards;

compare the flow rate of the coolant to a threshold flow
rate;

determining that a total flow rate of the coolant is less than
the threshold flow rate; and in response to determining that the flow rate of the coolant
is less than the threshold flow rate, cause an autono-
mous vehicle to perform a minimal risk maneuver.

16. The non-transitory computer-readable medium of
claim 15, wherein the minimal risk maneuver comprises
pulling over the autonomous vehicle on a side of a road.

17. The non-transitory computer-readable medium of
claim 15, wherein the minimal risk maneuver comprises
stopping the autonomous vehicle.

18. The non-transitory computer-readable medium of
claim 15, wherein the minimal risk maneuver comprises
reducing a speed of the autonomous vehicle.

19. The non-transitory computer-readable medium of
claim 15, wherein the coolant is a liquid coolant.

20. The non-transitory computer-readable medium of
claim 15, wherein:

the one or more pumps comprise a first pump and a
second pump;

the first pump operates at a full duty cycle; and the second pump operates at zero duty cycle.

* * * * *